US008236206B2

(12) United States Patent
Komatsu et al.

(10) Patent No.: US 8,236,206 B2
(45) Date of Patent: Aug. 7, 2012

(54) ELECTRODE CATALYST LAYER

(75) Inventors: Satoshi Komatsu, Chuo-ku (JP); Junji Kawai, Chuo-ku (JP); Toshihiro Ohtsuki, Chuo-ku (JP); Takanobu Yamamoto, Chuo-ku (JP); Ryoichiro Takahashi, Wako (JP); Kaoru Fukuda, Wako (JP); Hiroshi Shinkai, Wako (JP)

(73) Assignees: JSR Corporation, Tokyo (JP); Honda Motor Co., Ltd., Tokyo (JP)

( * ) Notice: Subject to any disclaimer, the term of this patent is extended or adjusted under 35 U.S.C. 154(b) by 257 days.

(21) Appl. No.: 12/092,316

(22) PCT Filed: Oct. 30, 2006

(86) PCT No.: PCT/JP2006/321654
§ 371 (c)(1),
(2), (4) Date: May 1, 2008

(87) PCT Pub. No.: WO2007/052605
PCT Pub. Date: May 10, 2007

(65) Prior Publication Data
US 2009/0134360 A1 May 28, 2009

(30) Foreign Application Priority Data

Nov. 1, 2005 (JP) ................................. 2005-318465

(51) Int. Cl.
*H01B 1/00* (2006.01)
(52) U.S. Cl. .......................... 252/500; 502/101; 528/397
(58) Field of Classification Search .................. 252/500; 429/33, 44, 42; 528/397; 502/101
See application file for complete search history.

(56) References Cited

U.S. PATENT DOCUMENTS

| 5,843,519 | A | 12/1998 | Tada |
| 7,348,089 | B2 * | 3/2008 | Okada et al. ................... 429/33 |
| 7,449,132 | B2 * | 11/2008 | Kakuta et al. ................ 252/500 |
| 2002/0188097 | A1 * | 12/2002 | Goto et al. .................... 528/397 |
| 2004/0127347 | A1 * | 7/2004 | Lee et al. ...................... 502/101 |
| 2004/0197632 | A1 * | 10/2004 | Sohma et al. ................... 429/33 |
| 2005/0019649 | A1 * | 1/2005 | Kakutani et al. ................ 429/42 |
| 2005/0282062 | A1 * | 12/2005 | Manako et al. ................. 429/44 |
| 2006/0141337 | A1 * | 6/2006 | Shibutani et al. .............. 429/42 |
| 2007/0020500 | A1 * | 1/2007 | Kanaoka et al. ................ 429/33 |
| 2009/0134360 | A1 * | 5/2009 | Komatsu et al. ............. 252/500 |

FOREIGN PATENT DOCUMENTS

| CN | 1553534 | * | 12/2004 |
| CN | 1553534 | A | 12/2004 |
| JP | 57-196477 | * | 12/1982 |
| JP | 01-0122565 | | 5/1989 |
| JP | 11-25992 | | 1/1999 |
| JP | 11-67225 | | 3/1999 |
| JP | 11-167925 | | 6/1999 |
| JP | 2001-23647 | | 1/2001 |
| JP | 2001-283875 | * | 10/2001 |
| JP | 2001-342241 | | 12/2001 |
| JP | 2002-293889 | | 10/2002 |
| JP | 2003-036859 | | 2/2003 |
| JP | 2003-109601 | | 4/2003 |
| JP | 2003-113136 | | 4/2003 |
| JP | 2004 14202 | | 1/2004 |
| JP | 2004-71362 | | 3/2004 |
| JP | 2004-137444 | | 5/2004 |
| JP | 2004-140001 | | 5/2004 |
| JP | 2004-273297 | * | 9/2004 |
| JP | 2004-345997 | | 12/2004 |
| JP | 2004-346163 | | 12/2004 |
| JP | 2005-036125 | | 2/2005 |
| JP | 2005-060625 | | 3/2005 |
| JP | 2005-135652 | | 5/2005 |
| JP | 2005-141966 | * | 6/2005 |
| JP | 2005 216750 | | 8/2005 |
| JP | 2006 344530 | | 12/2006 |
| JP | 2007 12505 | | 1/2007 |
| WO | 2004 075322 | | 9/2004 |

OTHER PUBLICATIONS

Japanese Office Action issued Sep. 27, 2011, in Patent Application No. 2007-542726.
Extended European Search Report dated Dec. 29, 2010.

* cited by examiner

*Primary Examiner* — Khanh Tuan Nguyen
(74) *Attorney, Agent, or Firm* — Oblon, Spivak, McClelland, Maier & Neustadt, L.L.P.

(57) ABSTRACT

The present invention provides an electrode catalyst layer comprising catalyst particles, an ion exchange resin and a water repellent agent. The water repellent agent contains (A) a fluorine-containing copolymer having a structure unit derived from a polyfluoroalkyl-containing (meth)acrylate and/or (B) a fluorine-containing copolymer having a structural unit represented by derived from a fluorine-containing olefin monomer and a structure unit represented derived from a vinyl ether monomer. The electrode catalyst layer contains 0.1 to 20% by weight of the water repellant agent. The electrode catalyst layer exhibits excellent balance between water retention and drainage in an electrode, good power generation performance under any of low humidity and high humidity conditions, and also excellent durability in power generation.

20 Claims, No Drawings

ELECTRODE CATALYST LAYER

TECHNICAL FIELD

The present invention relates to an electrode catalyst layer of a solid polymer electrolyte membrane-electrode assembly used for a polymer electrolyte fuel cell.

BACKGROUND ART

A polymer electrolyte fuel cell is composed of a cell unit, in which an anode electrode and a cathode electrode performing reactions for power generation, and a solid polymer electrolyte membrane serving as a proton conductor between the anode electrode and the cathode electrode, are sandwiched by separators.

The above electrodes are composed of an electrode substrate that accelerates gas diffusion and collects electrons and a catalyst layer where an electrochemical reaction actually takes place. Specifically, at the anode electrode a fuel gas is reacted at the catalyst layer to generate a proton and an electron, the electron is conducted to the electrode substrate and the proton is conducted through the electrode electrolyte to the solid polymer electrolyte membrane. On the other hand, at the cathode electrode, an oxidizing gas, the proton conducted from the polymer electrolyte membrane, and the electron conducted from the electrode substrate are reacted at the catalyst layer to form water.

As the solid polymer electrolyte membrane and the electrolyte in the electrode used for the above-mentioned polymer electrolyte fuel cell, a perfluoro-type electrolyte represented by Nafion (trade name, manufactured by E. I. du Pont de Nemours and Company) and various kinds of hydrocarbon electrolytes are known, and all of them require water in order to realize the proton conductivity.

Accordingly, when operation of the fuel cell is done under low humidity conditions, the electrical conductivity is decreased because the water content of the electrolyte is decreased, leading to the decrease in the output of the fuel cell. On the other hand, when the operation of the fuel cell is done under high humidity conditions, excessive water resides in the electrode because water is formed by the electrode reaction. Accordingly, if drainage of water in the electrode is insufficient, flooding takes place, leading to the decrease in the output of the fuel cell.

In order to avoid flooding under high humidity conditions, there is a case in which a water repellent agent is introduced into the electrode (for instance, refer to Patent Document 1). As such repellent agents, fluorine-containing resins such as polytetrafluoroethylene (PTFE), tetrafluoroethylene/hexafluoropropylene copolymer (FEP), tetrafluoroethylene/perfluoro(alkyl vinyl ether) copolymer (PFA), ethylene/tetrafluoroethylene copolymer (ETFE), poly(vinylidene fluoride) (PVDF) and the like are used.

By using the electrode catalyst layer containing the fluorine-containing resins, the water drainage in the electrode is improved because an improving effect of water repellency due to the fluorine-containing resins may be obtained. Therefore, the power generation performance may be improved by introducing the fluorine-containing resin when operation of the fuel cell was done under high humidity conditions, but it was not satisfactory.

In addition, when the electrode catalyst layer which contains the fluorine-containing resin is used under low humidity conditions in operation of the fuel cell, there is a problem of decrease in the output of the fuel cell and the like, because the water retention capacity in the electrode is decreased, which causes the water content in the electrolyte to decrease, leading to a decrease in the electrical conductivity.

Patent Document 1: Japanese Patent Laid-Open Publication No. H11-67225

DISCLOSURE OF THE INVENTION

Problems to be Solved by the Invention

An object of the present invention is to provide an electrode catalyst layer of a solid polymer electrolyte membrane-electrode assembly exhibiting excellent balance between water retention and drainage in an electrode, good power generation performance under any of low humidity and high humidity conditions, and also excellent durability in power generation.

Means for Solving the Problems

The present inventors carried out extensive investigation in order to address the aforementioned problems. As a result, the present inventors have found that these problems can be solved by using a specific fluorine-containing copolymer as a water repellent agent, and have accomplished this invention based on this finding.

Namely, the electrode catalyst layer of the present invention contains catalyst particles, an ion exchange resin and a water repellent agent, wherein the water repellent agent contains at least one kind selected from the group consisting of (A) a fluorine-containing copolymer having a structure unit derived from a polyfluoroalkyl-containing (meth)acrylate and (B) a fluorine-containing copolymer having a structure unit represented by the following general formula (1) derived from a fluorine-containing olefin monomer and a structure unit represented by the following general formula (2) derived from a vinyl ether monomer.

(1)

In the formula (1), $X^1$ represents a fluorine atom, a fluoroalkyl group or a group represented by $-OW^1$ ($W^1$ represents an alkyl group or a fluoroalkyl group).

(2)

In the formula (2), $X^2$ represents a hydrogen atom or a methyl group, $X^3$ represents a group represented by $-(CH_2)_hOW^2$ ($W^2$ represents an alkyl group, a hydroxyalkyl group, a glycidyl group or a fluoroalkyl group, and h represents an integer of 0 to 2), a group represented by $-OCOW^3$ ($W^3$ represents an alkyl group, a hydroxyalkyl group or a glycidyl group), a carboxyl group or an alkoxycarbonyl group.

Effect of the Invention

According to the present invention, an electrode catalyst layer having an excellent balance between water retention and drainage properties in the electrode is provided. By using a membrane-electrode assembly having the electrode catalyst layer of the present invention, a fuel cell realizing excellent power generation performance under both low and high humidity conditions and excellent durability in power generation can be obtained.

BEST MODE FOR CARRYING OUT THE INVENTION

In the following, the electrode catalyst layer of the present invention will be explained in detail. Here, an acrylate and a methacrylate are collectively called a (meth)acrylate in this description.

The electrode catalyst layer of the present invention is composed of catalyst particles, an ion exchange resin and a water repellent agent, and may be formed by using an electrode paste composition containing the following components.

[Components of the Electrode Paste Composition]
(i) Catalyst Particles

Catalyst particles used for the electrode paste composition are composed of a catalyst which is supported on carbons or a metal oxide as a carrier, or a catalyst itself.

As the catalyst, platinum or a platinum alloy is used. When a platinum alloy is used, stability and activity as the electrode catalyst may be imparted further. For such platinum alloys, a platinum alloy with one or more kinds of metals selected from metals belonging to the platinum group other than platinum (ruthenium, rhodium, palladium, osmium and iridium), iron, cobalt, titanium, gold, silver, chromium, manganese, molybdenum, tungsten, aluminum, silicon, rhenium, zinc and tin, is preferable and an intermetallic compound between platinum and a metal to be alloyed may be contained in the platinum alloy. The catalyst is in the form of catalyst particles either as it is or in the state of being supported on a carrier.

As a carrier to support the catalyst, carbon blacks such as oil furnace black, channel black, lamp black, thermal black, acetylene black and the like are preferably used in view of good electron conductivity and a large specific surface area. Alternatively, natural graphite, artificial graphite obtained from organic compounds such as pitch, cokes, polyacrylonitrile, a phenolic resin, a furan resin and the like, carbon and the like may be used.

Examples of the oil furnace black include Vulcan XC-72, Vulcan P, Black Pearls 880, Black Pearls 1100, Black Pearls 1300, Black Pearls 2000, Regal 400 (all manufactured by Cabot Corp.), Ketchen Black EC (manufactured by Lion Corp.), #3150 and #3250 (both manufactured by Mitsubishi Chemical Corp.), and the like. Examples of the acetylene black include Denka Black (manufactured by Denki Kagaku Kogyo Kabushiki Kaisha) and the like.

As the form of the carbons, a fibrous form may be used in addition to a particular form. The amount of the catalyst to be supported on a carrier is not particularly restricted as far as the catalyst activity is effectively realized, but is usually 0.1 to 9.0 g-metal/g-carbon and preferably 0.25 to 2.4 g-metal/g-carbon relative to the carbon weight.

As the carrier, there may also be mentioned, for example, in addition to carbon, metal oxides such as titania, zinc oxide, silica, ceria, alumina, alumina spinel, magnesia, zirconia and the like.

(ii) Ion Exchange Resin

The ion exchange resin used in the electrode paste composition has functions to work as a binder component to bond the catalyst carrier carbon, to effectively deliver the ions generated by the reaction on the catalyst at the fuel electrode to the ion conductive membrane (solid polymer electrolyte membrane), and also to effectively deliver the ions from the ion conducting membrane to the catalyst at the air electrode.

The ion exchange resin used in the present invention is not particularly restricted. Although a perfluoro-type electrolyte, a hydrocarbon-type electrolyte or the like may be used, an aromatic polymer with a protonic acid group may be preferably used from the viewpoint of improved heat resistance and mechanical strength.

Examples of the aromatic polymers with a protonic acid group include a polyether ketone, a polyether ether ketone, a polyether sulfone, a polyimide, a polybenzoxazole, a polyarylene and the like. They may be used singly or in a combination of two or more kinds.

As a more preferable aromatic polymer with a protonic acid group, a polyarylene with a sulfonic acid group (hereinafter sometimes referred to simply as "sulfonated polyarylene") may be cited. As such a sulfonated polyarylene, a block copolymer in which (A) a polymer segment having a sulfonic acid group, (B) a polymer segment having no ion conducting group, and (C) a segment having a nitrogen-containing heterocyclic group in its side chain are covalently bonded is preferable. And particularly preferable is a sulfonated polyarylene represented by the following general formula (D) which is composed of the constituent unit represented by the following general formula (A) (hereinafter sometimes referred to as the "constituent unit (A)" or the "sulfonic acid unit"), the constituent unit represented by the following general formula (B) (hereinafter sometimes referred to as the "constituent unit (B)" or the "hydrophobic unit"), and the constituent unit represented by the following general formula (C) (hereinafter sometimes referred to as the "constituent unit (C)" or the "basic unit"). By using such sulfonated polyarylenes, the electrode catalyst layer having further improved heat resistance and mechanical strength may be formed.

<Constituent Unit (A) (Sulfonic Acid Unit)>

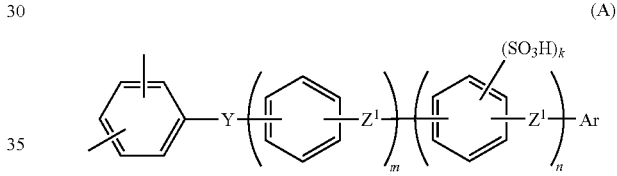

In the formula (A), Y represents —CO—, —SO$_2$—, —SO—, —CONH—, —COO—, —(CF$_2$)$_i$-(i represents an integer of 1 to 10) or —C(CF$_3$)$_2$—. Among them, —CO— and —SO$_2$— are preferable.

Z$^1$ independently represents a direct bond, —(CH$_2$)$_j$— (j represents an integer of 1 to 10), —C(CH$_3$)$_2$—, —O— or —S—. Among them, a direct bond and —O— are preferable.

Ar represents an aromatic group having a substituent such as —SO$_3$H, —O(CH$_2$)$_g$SO$_3$H or —O(CF$_2$)$_g$SO$_3$H (g represents an integer of 1 to 12). As the aromatic groups, there may be mentioned, for example, a phenyl group, a naphthyl group, an anthryl group, a phenanthryl group and the like. Among them, a phenyl group and a naphthyl group are preferable. In addition, Ar is required to contain at least one substituent represented by —SO$_3$H, —O(CH$_2$)$_g$SO$_3$H or —O(CF$_2$)$_g$SO$_3$H, and in the case of a naphthyl group it is preferred that two or more of these substituents are contained.

Here, m represents an integer of 0 to 10 and preferably 0 to 2, n represents an integer of 0 to 10 and preferably 0 to 2, and k represents an integer of 1 to 4.

Preferred Examples of the constituent unit (A) include structures represented by the formula (A) in which:
(1) m is 0, n is 0, Y is —CO—, and Ar is a phenyl group having —SO$_3$H as the substituent;
(2) m is 1, n is 0, Y is —CO—, Z is —O—, and Ar is a phenyl group having —SO$_3$H as the substituent;
(3) m is 1, n is 1, k is 1, Y is —CO—, Z is —O—, and Ar is a phenyl group having —SO$_3$H as the substituent;
(4) m is 1, n is 0, Y is —CO—, Z is —O—, and Ar is a naphthyl group having two —SO$_3$H as the substituent; and
(5) m is 1, n is 0, Y is —CO—, Z is —O—, and Ar is a phenyl group having —O(CH$_2$)$_4$SO$_3$H as the substituent.

<Constituent Unit (B) (Hydrophobic Unit)>

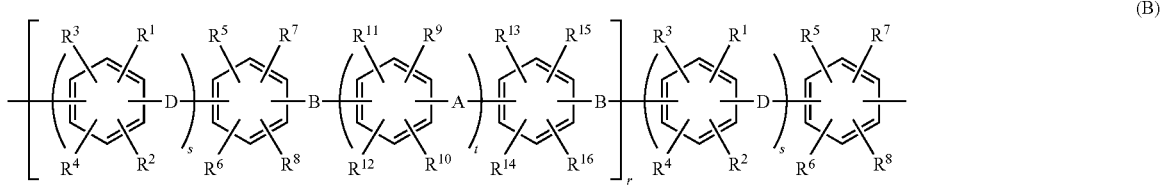

(B)

In the formula (B), A and D each independently represent a direct bond, —CO—, —SO$_2$—, —SO—, —CONH—, —COO—, —(CF$_2$)$_i$-(i represents an integer of 1 to 10), —(CH$_2$)$_j$— (j represents an integer of 1 to 10), —CR'$_2$—, a cyclohexylidene group, a fluorenylidene group, —O— or —S—. Among them, a direct bond, —CO—, —SO$_2$—, —CR'$_2$—, a cyclohexylidene group, a fluorenylidene group, and —O— are preferable. Here, R' represents an aliphatic hydrocarbon group, an aromatic hydrocarbon group or a halogenated hydrocarbon group, and for example, there may be mentioned a methyl group, an ethyl group, a propyl group, an isopropyl group, a butyl group, an isobutyl group, a t-butyl group, a propyl group, an octyl group, a decyl group, an octadecyl group, a phenyl group, a trifluoromethyl group and the like.

B independently represents an oxygen atom or a sulfur atom, of which an oxygen atom is preferable.

$R^1$ to $R^{16}$ each independently represent a hydrogen atom, a fluorine atom, an alkyl group, a partially or a fully halogenated alkyl group, an allyl group, an aryl group, a nitro group or a nitrile group.

Examples of the alkyl group in $R^1$ to $R^{16}$ include a methyl group, an ethyl group, a propyl group, a butyl group, an amyl group, a hexyl group, a cyclohexyl group, an octyl group and the like. Examples of the halogenated alkyl group include a trifluoromethyl group, a pentafluoroethyl group, a perfluoropropyl group, a perfluorobutyl group, a perfluoropentyl group, a perfluorohexyl group and the like. Examples of the allyl group include a propenyl group and the like. Examples of the aryl group include a phenyl group, a pentafluorophenyl group and the like.

Here, s and t each independently represent an integer of 0 to 4; and r represents 0 or an integer of 1 or more, whose upper limit is usually 100 and preferably 1 to 80.

Preferred examples of the constituent units (B) include structures represented by Formula (B) in which:
(1) s is 1, t is 1, A is —CR'$_2$—, a cyclohexylidene group or a fluorenylidene group, B is an oxygen atom and D is —CO— or —SO$_2$— and $R^1$ to $R^{16}$ are a hydrogen atom or a fluorine atom;
(2) s is 1, t is 0, B is an oxygen atom, D is —CO— or —SO$_2$—, and $R^1$ to $R^{16}$ are a hydrogen atom or a fluorine atom; and
(3) s is 0, t is 1, A is —CR'$_2$—, a cyclohexylidene group or a fluorenylidene group, B is an oxygen atom and $R^1$ to $R^{16}$ are a hydrogen atom, a fluorine atom or a nitrile group.

<Constituent Unit (C) (Basic Unit)>

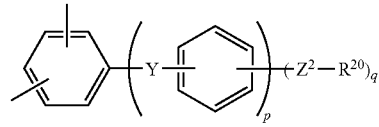

(C)

In the formula (C), $Z^2$ independently represents a direct bond, —O— or —S—; Y represents —CO—, —SO$_2$—, —SO—, —CONH—, —COO—, —(CF$_2$)$_i$-(i represents an integer of 1 to 10) or —C(CF$_3$)$_2$—; $R^{20}$ independently represents a nitrogen-containing heterocyclic group; p represents an integer of 0 to 4, and q represents an integer of 1 to 5.

There is no particular restriction as to the nitrogen-containing heterocyclic group, and examples include nitrogen-containing heterocyclic compounds such as pyrrole, thiazole, isothiazole, oxazole, isoxazole, pyridine, imidazole, imidazoline, pyrazole, 1,3,5-triazine, pyrimidine, pyridazine, pyrazine, indole, quinoline, isoquinoline, purine, benzimidazole, benzoxazole, benzothiazole, tetrazole, tetrazine, triazole, carbazole, acridine, quinoxaline, quinazoline and the like, or groups derived from these groups.

<Polymer Structure>

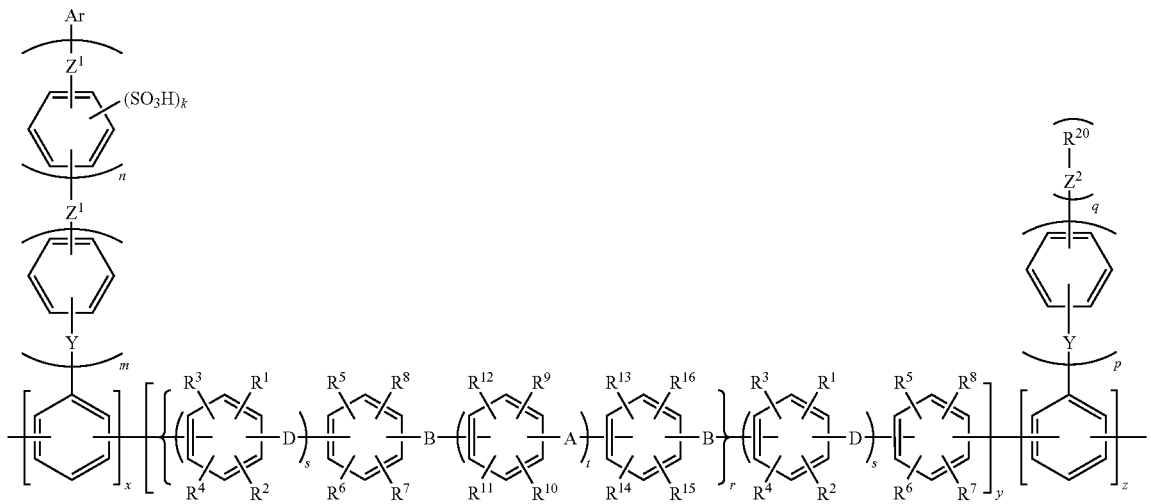

(D)

In the formula (D), A, B, D, Y, $Z^1$, $Z^2$, Ar, k, m, n, p, q, r, s, t, $R^1$ to $R^{16}$ and $R^{20}$ are as those defined in the formulae (A), (B) and (C), and x, y and z represent the molar ratio when x+y+z=100 mol %.

The constituent units (B) and (C) are arbitrary components, and the amount that remains after subtracting (A) in a polymer corresponds to the amount of the constituent units (B) and (C). The constituent unit (B) and/or (C) may not be contained. When the constituent unit (B) is contained, the molecular weight, contents of each of the constituent units, ion exchange capacity and the like may be adjusted easily, and a polymer with suppressed swelling or dissolving in hot water and with good heat and chemical stabilities may be obtained. When the constituent unit (C) is contained, stability of the sulfonic acid group under high temperature conditions is improved owing to the nitrogen-containing heterocyclic group, resulting in improved heat resistance. The nitrogen atom of a nitrogen-containing heterocyclic aromatic compound has a basic character and thus forms an ionic interaction with the sulfonic acid group. Owing to this, stability of the sulfonic acid group is improved, resulting in the suppression of the release of the sulfonic acid group under high temperature conditions. By the same token, a crosslinking reaction among polymers under high temperature conditions due to the sulfonic acid group may be suppressed. The nitrogen-containing heterocyclic aromatic compound is a compound that has basicity sufficient to exert these effects without impairing the proton conductivity.

In the sulfonated polyarylenes, the ratio of the content of the constituent unit (C) (z mol %) relative to that of the constituent unit (A) (x mol %), [z/x], is 0.001 to 50, preferably 0.1 to 30, and far preferably 1 to 25.

The ion exchange capacity of the ion exchange resin may be adjusted appropriately by changing the kind, the ratio or the combination of the constituent units (A), (B) and (C). Therefore, the ion exchange capacity may be adjusted by changing the charge ratio of precursors (monomer and oligomer) and their kinds leading to the constituent units (A) to (C) at the time of polymerization.

If the ion exchange capacity of the polymer electrolyte containing 0 to 40% of fluorine is too low, the proton conductivity in a fuel cell is not realized, leading to insufficient power output. On the other hand, if it is too high, hot water generated in a fuel cell plugs micropores due to dissolving and swelling, which prevents a reactive gas from reaching the catalyst, resulting in the problem of decrease in power output and the like.

Accordingly, the ion exchange capacity is preferably 0.5 to 3.0 meq/g, and more preferably 0.8 to 2.8 meq/g.

The molecular weight of the sulfonated polyarylenes is 10,000 to 1,000,000 and preferably 20,000 to 800,000 relative to the weight-average molecular weight of polystyrene measured by gel permeation chromatography (GPC).

<Method for Preparing a Sulfonated Polyarylene>

As the methods for preparing the sulfonated polyarylenes, there may be mentioned, for example, following method A, method B, method C and the like.

(Method A)

For example, the sulfonated polyarylene can be obtained in a similar manner to that disclosed in the Japanese Patent Laid-Open Publication No. 2004-137444, by copolymerizing a monomer represented by the following general formula (A') (hereinafter sometimes referred to as the "monomer (A')"), a monomer represented by the following general formula (B') (hereinafter sometimes referred to as the "monomer (B')"), and a monomer represented by the following general formula (C') (hereinafter sometimes referred to as the "monomer (C')") to give a polymer having a sulfonate ester group, which is then subjected to the de-esterification reaction to be converted to a sulfonic acid group.

Monomer (A')

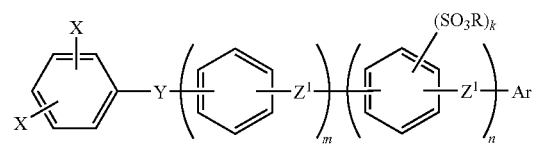

In the formula (A'), X independently represents an atom or a group selected form a chlorine atom, a bromine atom and —$OSO_2R^b$ (wherein $R^b$ represents an alkyl group, a fluorine-substituted alkyl or aryl group), and R represents an alkyl group having 4 to 12 carbon atoms. Y, $Z^1$, Ar, m, n and k are the same as those defined in the formula (A).

Specific examples of the monomer (A') include the compounds represented by the following formula, the sulfonated esters and the like disclosed in the Japanese Patent Laid-Open Publication Nos. 2004-137444, 2004-345997 and 2004-346163.

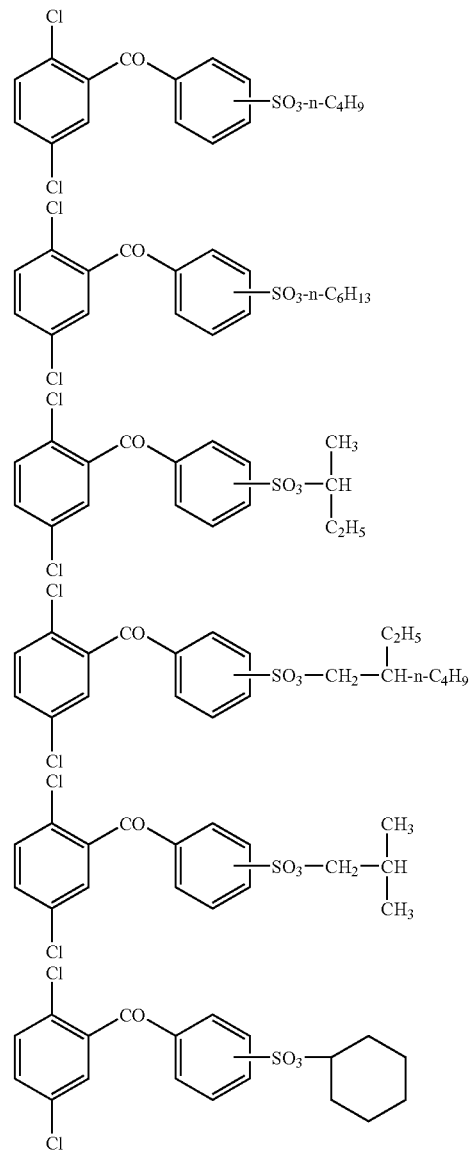

-continued
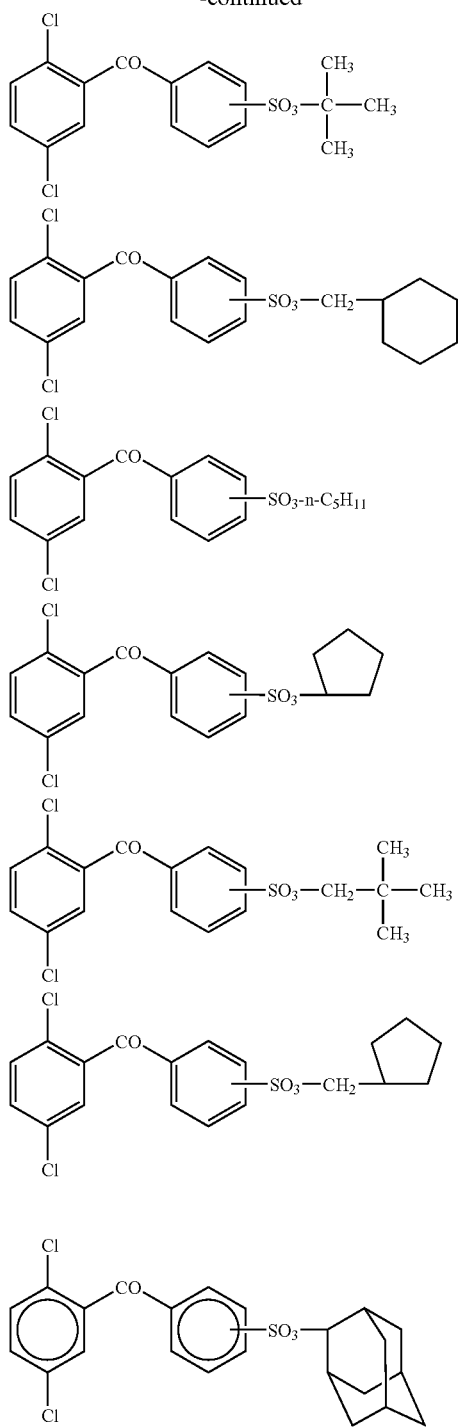
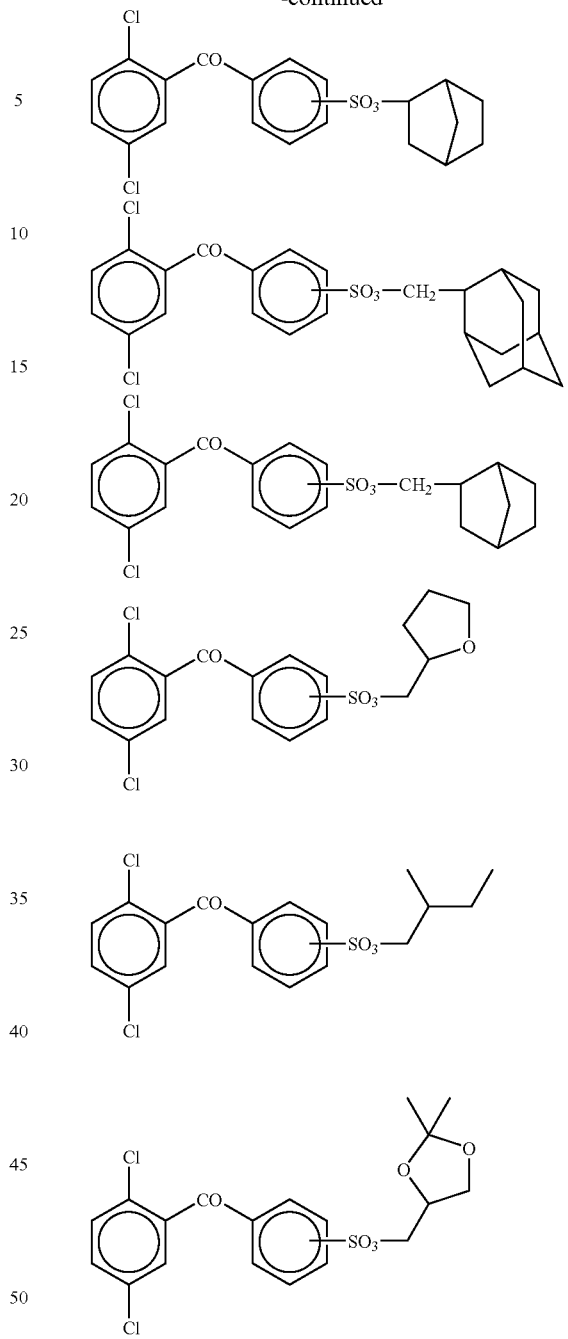
In the monomer (A'), the sulfonate ester structure is usually bonded at the meta position of an aromatic ring.
Monomer (B')
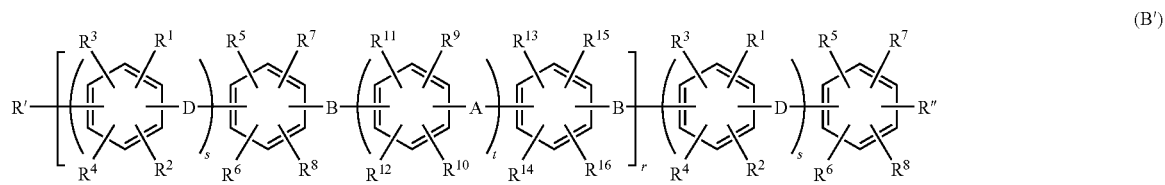
(B')

In the formula (B'), R' and R" each represent an atom or a group selected from a chlorine atom, a bromine atom and —OSO$_2$R$^b$ (here, R$^b$ represents an alkyl group, a fluorine-substituted alkyl or aryl group). R$^1$ to R$^{16}$, A, B, D, s, t and r are the same as those defined in the formula (B).

Specific examples of the monomer (B') include, when r is 0 in the formula (B'), 4,4'-dichlorobenzophenone, 4,4'-dichlorobenzanilide, 2,2-bis(4-chlorophenyl)difluoromethane, 2,2-bis(4-cholorophenyl)-1,1,1,3,3,3-hexafluoropropane, 4-chlorobenzoic acid 4-chlorophenyl ester, bis(4-chlorophenyl)sulfoxide, bis(4-chlorophenyl)sulfone, 2,6-dichlorobenzonitrile and the like. Furthermore, in these compounds, a compound whose chlorine atom is displaced by a bromine atom or an iodine atom may also be included.

Furthermore, when r is 1 in the formula (B'), compounds shown in the following and compounds disclosed in the Japanese Patent Laid-Open Publication No. 2003-113136 may be mentioned.

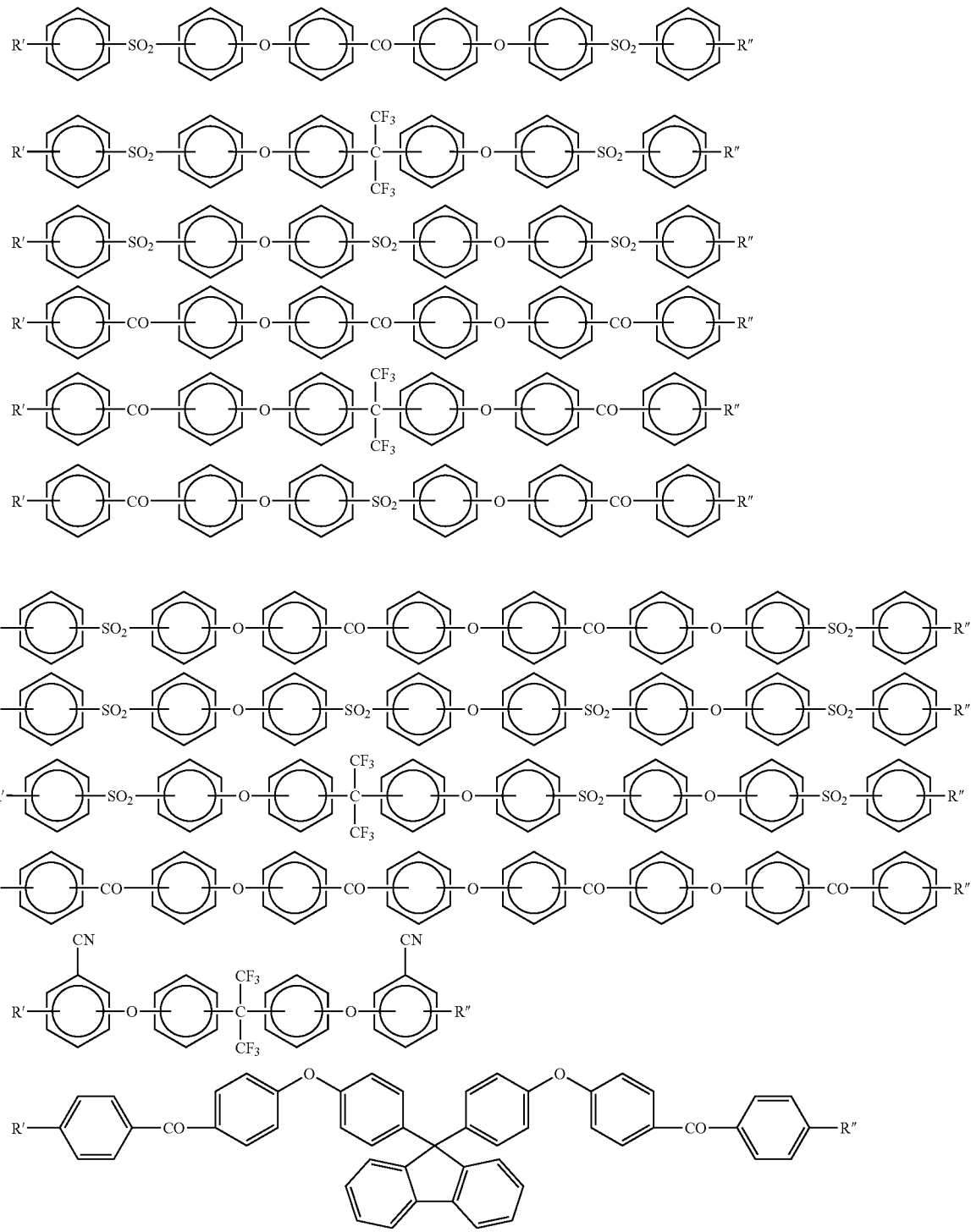

When r is 2 or larger in the formula (B'), the compounds shown by the following structures may be mentioned as examples.
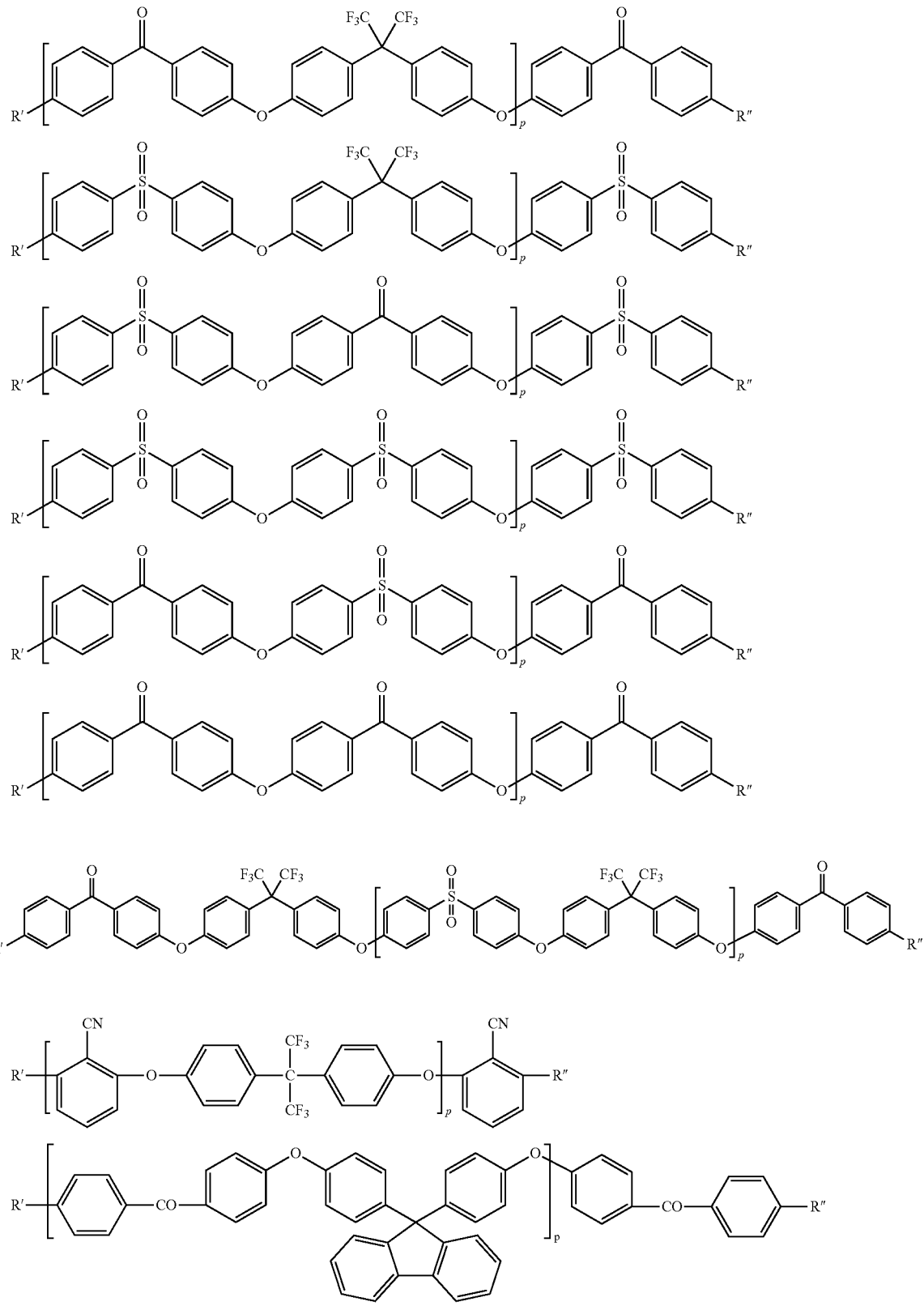

Monomer (C')
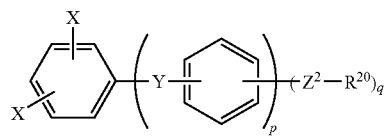
In the formula (C'), X independently represents an atom or a group selected from a chlorine atom, a bromine atom and —OSO$_2$R$^b$ (here, R$^b$ represents an alkyl group, a fluorine-substituted alkyl or an aryl group). Y, Z$^2$, R$^{20}$, p and q are the same as those defined in the formula (C).
Specific examples of the monomer (C') include compounds as shown below.
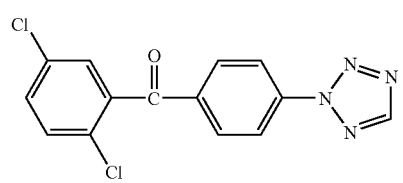
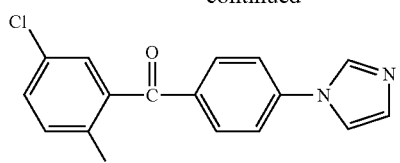
-continued
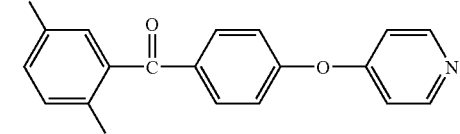
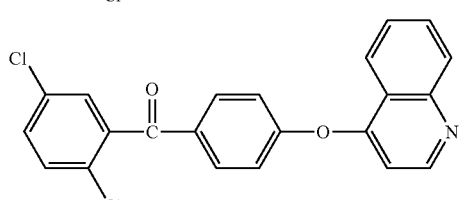
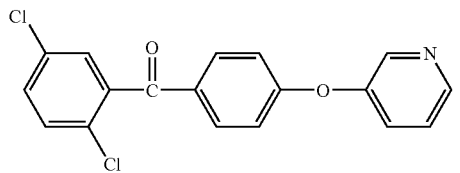
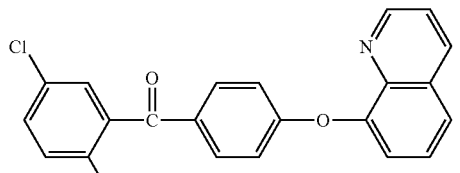
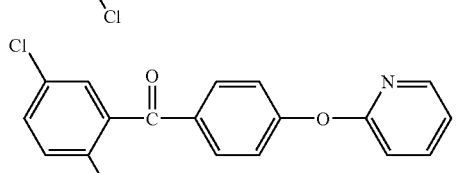
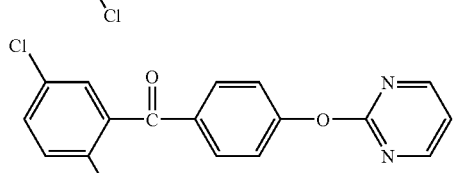
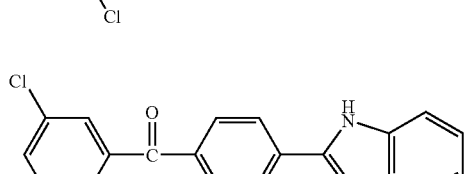
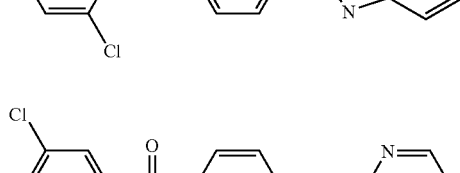
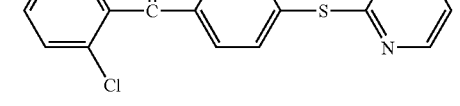

-continued

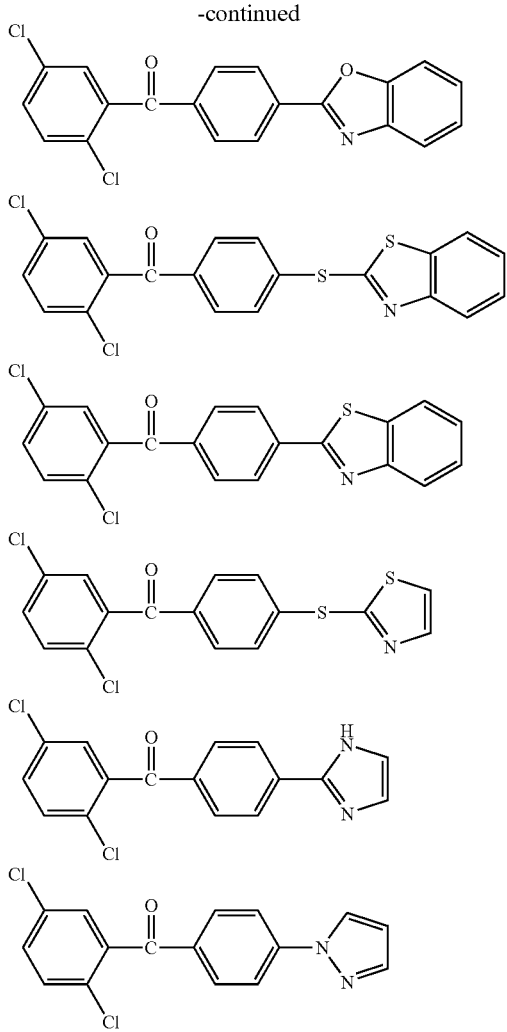

Furthermore, in the above compounds, a compound whose chlorine atom is displaced by a bromine atom, an isomer whose chlorine or bromine atom is bonded at different bonding positions, and a compound whose —CO— bond is displaced by —SO$_2$— bond may also be cited. The monomer (C') may be used singly or in a combination of two or more kinds.

Examples of a method for synthesizing the monomer (C') include a nucleophilic substitution reaction between a compound represented by the following general formula (4) (hereinafter sometimes referred to as the "compound (4)") and a nitrogen-containing heterocyclic compound.

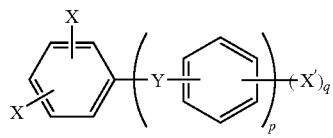

(4)

In the formula (4), X, Y, p and q are the same as those defined in the formula (C'). X' represents a halogen atom, of which a fluorine atom or a chlorine atom is preferable, and a fluorine atom is more preferable.

Examples of the compounds (4) include 2,4-dichloro-4'-fluorobenzophenone, 2,5-dichloro-4'-fluorobenzophenone, 2,6-dichloro-4'-fluorobenzophenone, 2,4-dichloro-2'-fluorobenzophenone, 2,5-dichloro-2'-fluorobenzophenone, 2,6-dichloro-2'-fluorobenzophenone, 2,4-dichlorophenyl-4'-fluorophenyl sulfone, 2,5-dichlorophenyl-4'-fluorophenyl sulfone, 2,6-dichlorophenyl-4'-fluorophenyl sulfone, 2,4-dichlorophenyl-2'-fluorophenyl sulfone and the like. Among them, 2,5-dichloro-4'-fluorobenzophenone is preferable.

The nitrogen-containing heterocyclic compounds are those having an active hydrogen atom, which is subjected to a substitution reaction with the group represented by X' in the compound (4).

Examples of the nitrogen-containing heterocyclic compounds having an active hydrogen atom include pyrrole, thiazole, isothiazole, oxazole, isoxazole, pyridine, imidazole, imidazoline, pyrazole, 1,3,5-triazine, pyrimidine, pyridazine, pyrazine, indole, quinoline, isoquinoline, purine, benzimidazole, benzoxazole, benzothiazole, tetrazole, tetrazine, triazole, carbazole, acridine, quinoxaline, quinazoline, 2-hydroxypyridine, 3-hydroxypyridine, 4-hydroxypyridine, 3-hydroxyquinoline, 8-hydroxyquinoline, 2-hydroxypyrimidine, 2-mercaptopyridine, 3-mercaptopyridine, 4-mercaptopyridine, 2-mercaptopyrimidine, 2-mercaptobenzothiazole and the like. Among them, pyrrole, imidazole, indole, carbazole, benzoxazole and benzimidazole are preferable.

The reaction between the compound (4) and the nitrogen-containing heterocyclic compound having an active hydrogen is preferably carried out in an organic solvent. As the organic solvent, polar solvents such as N-methyl-2-pyrrolidone, N,N-dimethyl acetamide, sulfolane, diphenyl sulfone, dimethyl sulfoxide and the like may be used. In order to accelerate the reaction, an alkali metal, an alkali metal hydride, an alkaline metal hydroxide, an alkali metal carbonate salt and the like may be used. The ratio between the compound (2) and the nitrogen-containing heterocyclic compound having an active hydrogen is preferably equimolar or with an excess of the nitrogen-containing heterocyclic compound having an active hydrogen. Specifically, the amount of the nitrogen-containing heterocyclic compound having an active hydrogen is 1 to 3 mol, and preferably 1 to 1.5 mol relative to 1 mol of the compound (4).

The reaction temperature is 0° C. to 300° C. and preferably 10° C. to 200° C., and the reaction time is 15 minutes to 100 hours, and preferably 1 to 24 hours.

It is preferable that a product is used after being purified by recrystallization and the like.

Polymerization Method and its Conditions

In order to obtain the sulfonated polymer, the monomer (A'), monomer (C') and optionally monomer (B') are copolymerized to obtain a precursor.

This copolymerization is carried out in the presence of a catalyst. The catalyst used therein is a catalyst system containing a transition metal compound. The catalyst system contains as essential components (1) a transition metal salt and a compound capable of being a ligand (hereinafter referred to as the "ligand component"), or a transition metal complex (including a copper salt) coordinated with a ligand, and (2) a reducing agent, and in addition, a "salt" may optionally be added in order to accelerate the polymerization rate.

As to specific examples of these catalyst components, the ratio of each component, and polymerization conditions such as a reaction solvent, concentrations, temperature, time and the like, the compounds and the conditions described in the Japanese Patent Laid-Open Publication No. 2001-342241 may be adopted.

For example, as the transition metal salts, nickel chloride, nickel bromide and the like are preferably used, and as the compounds capable of being the ligand, triphenyl phosphine, tri-o-tolyl phosphine, tri-m-tolyl phosphine, tri-p-tolyl phosphine, tributyl phosphine, tri-tert-butyl phosphine, trioctyl phosphine, 2,2'-bipyridine and the like are preferably used. Furthermore, as the transition metal (salts) coordinated with the ligands in advance, bis(triphenyl phosphine)nickel chloride and (2,2'-bipyridine)nickel chloride are suitably used. Examples of the reducing agent include iron, zinc, manganese, aluminum, magnesium, sodium, calcium and the like, and zinc, magnesium and manganese are preferable. As the "salts", sodium bromide, sodium iodide, potassium bromide, tetraethyl ammonium bromide and tetraethyl ammonium iodide are preferable. In the reaction, a polymerization solvent may be used, and specifically, tetrahydrofuran, N,N-dimethyl formamide, N,N-dimethyl acetamide, 1-methyl-2-pyrrolidone and the like may suitably be used.

As to the ratio of each component in the catalyst system, the ratio of the transition metal salt or the transition metal (salt) coordinated with the ligand relative to 1 mol of total monomers is usually 0.0001 to 10 mol, and preferably 0.01 to 0.5 mol. Within this range, high catalyst activity and a high molecular weight can be attained in the polymerization. When the "salt" is used in the catalyst system, its ratio relative to 1 mol of total monomers is usually 0.001 to 100 mol and preferably 0.01 to 1 mol. Within this range, the acceleration effect on the polymerization rate is sufficient. The concentration of total monomers in a polymerization solvent is usually 1 to 90% by weight, and preferably 5 to 40% by weight. Further, the polymerization temperature is usually 0 to 200° C., and preferably 50 to 100° C., and the polymerization time is usually 0.5 to 100 hours, and preferably 1 to 40 hours.

Next, the obtained polymers are hydrolyzed to convert the sulfonate ester group (—$SO_3R$) in the constituent unit to a sulfonic acid group (—$SO_3H$).

The hydrolysis reaction may be performed by the methods in which (1) the polymer having the sulfonate ester group is charged into an excessive water or alcohol which contain a small quantity of hydrochloric acid, and then stirred for five minutes or longer, (2) the polymer having the sulfonate ester group is reacted in trifluoroacetic acid at about 80 to about 120° C. for about 5 to about 10 hours, (3) the polymer having the sulfonate ester group is reacted at about 80 to about 150° C. for about 3 to about 10 hours in a solution, in N-methylpyrrolidone, for example, containing 1 to 3 mol of lithium bromide relative to 1 mol of the sulfonate ester group (—$SO_3R$) in the polymer, followed by the addition of hydrochloric acid, and others.

(Method B)

For example, in a similar manner to that described in the Japanese Patent Laid-Open Publication No. 2001-342241, the synthesis may be performed by copolymerizing a monomer having the structure represented by the formula (A') and no sulfonic acid group or sulfonate ester group with the monomer (B') and the monomer (C') to obtain a copolymer, which is then sulfonated by a sulfonation agent.

As the specific example of the monomer useful in the method B, which has neither the sulfonate ester group nor the sulfonic acid group and is capable of being the constituent unit (A), the dihalogen compound disclosed in the Japanese Patent Laid-Open Publication Nos. 2001-342241 and 2002-293889 may be mentioned.

(Method C)

When Ar in the formula (A) is an aromatic group having a substituent represented by —$O(CH_2)_gSO_3H$ or —$O(CF_2)_gSO_3H$, the synthesis may also be performed, for example in a similar manner to that disclosed in the Japanese Laid-Open Patent Application No. 2005-60625, by copolymerizing a precursor monomer capable of being the constituent unit (A), a monomer or an oligomer capable of being the constituent unit (B), and a monomer capable of being the constituent unit (C), which is then followed by introducing an alkylsulfonic acid or a fluorine-substituted alkylsulfonic acid.

As the monomer useful in the method C and capable of being a precursor to the constituent unit (A), dihalides disclosed in the Japanese Laid-Open Patent Application No. 2005-36125 may be mentioned. Specific examples of them include 2,5-dichloro-4'-hydroxybenzophenone, 2,4-dichloro-4'-hydroxybenzophenone, 2,6-dichloro-4'-hydroxybenzophenone, 2,5-dichloro-2',4'-dihydroxybenzophenone, 2,4-dichloro-2',4'-dihydroxybenzophenone and the like.

Furthermore, a compound obtained by protecting a hydroxyl group of these compounds by a tetrahydropyranyl group and the like or displaced by a thiol group, or whose chlorine atom is displaced by a bromine atom or an iodine atom, may also be used.

An alkyl sulfonic acid group may be introduced into the precursor polymer by reacting the hydroxyl group of the precursor polymer having no sulfonic acid group with propanesultone or butanesultone.

(iii) Water Repellent Agent

A water repellent agent used in the electrode catalyst layer of the present invention contains at least one kind selected from the group consisting of (A) a fluorine-containing copolymer having a structure unit derived from a polyfluoroalkyl-containing (meth)acrylate (hereinafter referred to as "fluorine-containing copolymer (A)"), and (B) a fluorine-containing copolymer (hereinafter referred to as "fluorine-containing copolymer (B)") having a structure unit represented by the following general formula (1) derived from a fluorine-containing olefin monomer (hereinafter sometimes referred to as the "structure unit (1)") and a structure unit represented by the following general formula (2) derived from a vinyl ether monomer (hereinafter sometimes referred to as the "structure unit (2)").

(1)

In the formula (1), $X^1$ represents a fluorine atom, a fluoroalkyl group or a group represented by —$OW^1$ ($W^1$ represents an alkyl group or a fluoroalkyl group).

(2)

In the formula (2), $X^2$ represents a hydrogen atom or a methyl group, $X^3$ represents a group represented by —$(CH_2)_hOW^2$ ($W^2$ represents an alkyl group, a hydroxyalkyl group, a glycidyl group or a fluoroalkyl group; h represents an integer of 0 to 2), a group represented by —$OCOW^3$ ($W^3$ represents an alkyl group, a hydroxyalkyl group or a glycidyl group), a carboxyl group or an alkoxycarbonyl group.

In the present invention, the fluorine-containing copolymer (B) is preferable in view of relatively good dispersion in the electrode, and the fluorine-containing copolymer (B) further having a structure unit derived from a hydroxyl-containing monomer is particularly preferable because it disperses relatively well in the ion exchange resin, resulting in improved water drainage in the electrode.

In the following, the fluorine-containing copolymers (A) and (B) will be explained more specifically.

<Fluorine-containing Copolymer (A)>

The fluorine-containing copolymer (A) has a structure unit derived from a (meth)acrylate which contains a polyfluoroalkyl group (hereinafter referred to as the "$R^f$ group").

Here, the $R^f$ group represents an alkyl group having two or more of hydrogen atoms displaced by fluorine atoms. The number of carbon atoms in the $R^f$ group is preferably 1 to 20, and particularly preferably 4 to 16. The $R^f$ group may have a linear or branched structure, and in the case of the branched structure, it is preferable that the branched part is located at the terminal part of the $R^f$ group. A part of the carbon atoms of the $R^f$ group may be displaced by an ethereal oxygen atom or a thioethereal sulfur atom. Furthermore the $R^f$ group may contain a halogen atom (for example a chlorine atom and the like) other than a fluorine atom.

Furthermore, the $R^f$ group is preferably the perfluoroalkyl group in which all of the hydrogen atoms in an alkyl group are displaced by fluorine atoms in view of easiness of imparting water repellent properties to the electrode catalyst layer, and the group having the perfluoroalkyl group at its terminal is preferable.

As the $R^f$-containing (meth)acrylate to be used for preparation of the fluorine-containing copolymer (A), a compound represented by the following general formula (6) is preferable.

$$CH_2=C(R)COO-Q-R^f \quad (6)$$

In the formula (6), R represents a hydrogen atom or a methyl group. Q represents a divalent organic group, preferably an alkylene group and a divalent group containing an alkylene group, and more preferably an alkylene group. Specifically, $-CH_2CH_2-$, $-CH(CH_3)CH_2-$, $-CH_2CH_2N(CH_3)CO-$, $-CH_2CH_2N(CH_3)SO_2-$, $-CH(CH_2Cl)CH_2OCH_2CH_2N(CH_3)SO_2-$ and the like are preferable.

The $R^f$ group is preferably a perfluoroalkyl group as mentioned above, and a linear perfluoroalkyl group represented by $C_nF_{2n+1}-$ (n represents an integer of 4 to 16, preferably an integer of 6 to 12) is particularly preferable.

Examples of the $R^f$-containing (meth)acrylate represented by the formula (6) include $CH_2=CRCOOCH_2CH_2R^f$, $CH_2=CRCOOCH(CH_3)CH_2R^f$, $CH_2=CRCOOCH_2CH_2N(CH_3)COR^f$, $CH_2=CRCOOCH_2CH_2N(C_2H_5)COR^f$, $CH_2=CRCOOCH_2CH_2N(C_3H_7)COR^f$, $CH_2=CRCOOCH_2CH_2N(CH_3)SO_2R^f$, $CH_2=CRCOOCH_2CH_2N(C_2H_5)SO_2R^f$, $CH_2=CRCOOCH_2CH_2N(C_3H_7)SO_2R^f$, $CH_2=CRCOOCH(CH_2Cl)CH_2OCH_2CH_2N(CH_3)SO_2R^f$ and the like, but the present invention is not restricted by them.

The $R^f$-containing (meth)acrylate may be used singly or in a combination of two or more kinds. Furthermore, two or more kinds of compounds having different numbers of carbon atoms in the $R^f$ group may also be used.

It is preferable that the fluorine-containing copolymer (A) should contain a polymer unit derived from a monomer other than the $R^f$-containing (meth)acrylate (hereinafter referred to as "another monomer") for such purposes as adjusting the fluorine content in the polymer.

As the other monomer, a monomer having a radical-polymerizable unsaturated bond is preferable. Specific examples of them include vinyl chloride, stearyl (meth)acrylate, ethylene, vinyl acetate, vinyl fluoride, halogenated vinyl styrene, α-methyl styrene, p-methyl styrene, (meth)acrylic acid, (meth)acrylic acid alkyl ester, polyoxyalkylene (meth)acrylate, (meth)acrylamide, diacetone (meth) acrylamide, N-methylol (meth)acrylamide, vinyl alkyl ether, halogenated alkyl vinyl ether, vinyl alkyl ketone, butadiene, isoprene, chloroprene, glycidyl (meth)acrylate, aziridinyl (meth)acrylate, benzyl (meth)acrylate, 2-isocyanatoethyl (meth)acrylate, cyclohexyl (meth)acrylate, 2-ethylhexyl (meth)acrylate, maleic anhydride, polysiloxane-containing (meth)acrylate, N-vinyl carbazole and the like. Among them, vinyl chloride and stearyl (meth)acrylate are particularly preferable in view of improved water repellent properties.

In the fluorine-containing copolymer (A), the content of the polymer unit derived from the $R^f$-containing (meth)acrylate is 25 to 100% by weight and preferably 30 to 85% by weight relative to said polymer (A). By maintaining the content of the polymer unit derived from the $R^f$-containing (meth)acrylate in the above range, it is possible to obtain excellent balance between water repellent properties and retention of water in the electrode catalyst layer, leading to good power generation performance under both low and high humidity conditions, and to improved durability in power generation.

The fluorine-containing copolymer (A) may be prepared by using the $R^f$-containing (meth)acrylate and optionally other monomers by appropriately using a publicly or conventionally known polymerization method and conditions.

Examples of the polymerization methods include such methods as bulk polymerization, suspension polymerization, emulsion polymerization, solution polymerization and the like. Further, in addition to radical polymerization, it can also be prepared by polymerization reactions such as radiation polymerization and photopolymerization. Especially, an emulsion polymerization method by radical polymerization reaction is preferable.

When applying an emulsion polymerization method, a method in which a monomer, a surfactant and the like are emulsified in the presence of water followed by polymerization with stirring, is preferably adopted. Also a method in which a monomer, a surfactant, water and the like are emulsified in advance by using a homogenizing equipment such as a homogenizer and the like followed by polymerization with stirring is preferably used as well.

As the polymerization initiator, various kinds of polymerization initiators such as an organic peroxide, an azo compound, a persulfuric acid salt and the like are preferable. Furthermore, as the surfactant, various kinds of surfactants such as anionic, cationic, amphoteric or nonionic surfactants may be used.

The number-average molecular weight (Mn) of the fluorine-containing copolymer (A) used in the present invention is preferably 1,000 to 100,000, and particularly preferably 10,000 to 100,000. When Mn of the fluorine-containing copolymer (A) is below the range, imparting the water repellent properties to the electrode catalyst layer becomes difficult and thus obtaining good power generation performance under high humidity conditions tends to be difficult. On the contrary, when Mn of the fluorine-containing copolymer (A) is above the range, the viscosity of the electrode paste is drastically increased and thus fabrication of the electrode catalyst layer tends to be difficult.

<Fluorine-containing Copolymer (B)>

The fluorine-containing copolymer (B) contains the structure units (1) and (2), and preferably further contains a structure unit derived from a hydroxyl-containing monomer (hereinafter sometimes referred to as "hydroxyl-containing structure unit").

Examples of the fluoroalkyl group in $X^1$ in the structure unit (1) include fluoroalkyl groups having 1 to 6 carbon atoms such as a trifluoromethyl group, a perfluoroethyl group, a perfluoropropyl group, a perfluorobutyl group, a perfluorohexyl group, a perfluorocyclohexyl group and the like. Examples of the alkyl group in $W^1$ include alkyl groups having 1 to 6 carbon atoms such as a methyl group, an ethyl group, a propyl group, a butyl group, a hexyl group, a cyclohexyl group and the like. As examples of the fluoroalkyl group in $W^1$, the same fluoroalkyl group as in $X^1$ may be mentioned.

Examples of the alkoxycarbonyl group in $X^3$ in the structure unit (2) include a methoxycarbonyl group, an ethoxycarbonyl group and the like. Examples of the fluoroalkyl group in $W^2$ in the structure unit (2) may be the same as the fluoroalkyl group of $X^1$ in the structure unit (1). Examples of the alkyl groups in $W^2$ and $W^3$ in the structure unit (2) include alkyl groups having 1 to 12 carbon atoms such as a methyl group, an ethyl group, a propyl group, a hexyl group, a cyclohexyl group and a lauryl group. Further, examples of the hydroxyalkyl group in $W^2$ and $W^3$ include a 2-hydroxyethyl group, a 2-hydroxypropyl group, a 3-hydroxypropyl group, a 4-hydroxybutyl group, a 3-hydroxybutyl group, a 5-hydroxypentyl group, a 6-hydroxyhexyl group and the like.

As the example of the fluorine-containing olefin monomer capable of being the structure unit (1), a compound having at least one polymerizable unsaturated double bond and at least one fluorine atom may be mentioned. Specific examples of them include fluoroolefins such as tetrafluoroethylene, hexafluoropropylene and 3,3,3-trifluoropropylene;

alkyl perfluorovinyl ethers or fluoroalkyl perfluorovinyl ethers, which are represented by the formula $CF_2$=CF—O—$W^1$ ($W^1$ is the same as above);

perfluoro(alkyl vinyl ethers) such as perfluoro(methyl vinyl ether), perfluoro(ethyl vinyl ether), perfluoro(propyl vinyl ether), perfluoro(butyl vinyl ether) and perfluoro(isobutyl vinyl ether);

perfluoro(alkoxyalkyl vinyl ethers) such as perfluoro(propoxypropyl vinyl ether).

The fluorine-containing olefin monomer may be used singly or in a combination of two or more kinds. Among the fluorine-containing olefin monomers, hexafluoropropylene, perfluoroalkyl perfluorovinyl ether and perfluoro (alkoxyalkyl vinyl ether) are preferable, and it is more preferable to use a combination of these.

The content of the structure unit (1) in the fluorine-containing copolymer (B) is 20 to 70 mol %, preferably 25 to 60 mol %, and more preferably 30 to 55 mol %. When the content of the structure unit (1) is below the range, the water drainage properties of the electrode catalyst layer tends to be poor, resulting in occasional failure in obtaining good power generation performance under high humidity conditions. On the contrary, when it is above the range, solubility of the obtained fluorine-containing copolymer (B) in an organic solvent is drastically decreased, resulting in occasional difficulty in preparation of a homogeneous electrode paste composition.

Examples of the vinyl ether monomer capable of being the structure unit (2) include alkyl vinyl ethers or cycloalkyl vinyl ethers such as methyl vinyl ether, ethyl vinyl ether, n-propyl vinyl ether, isopropyl vinyl ether, n-butyl vinyl ether, isobutyl vinyl ether, tert-butyl vinyl ether, n-pentyl vinyl ether, n-hexyl vinyl ether, n-octyl vinyl ether, n-dodecyl vinyl ether, 2-ethylhexyl vinyl ether and cyclohexyl vinyl ether;

carboxylic acid vinyl esters such as vinyl acetate, vinyl propionate, vinyl butyrate, vinyl pivalate, vinyl caproate, vinyl versatate and vinyl stearate;

(meth)acrylate esters such as methyl (meth)acrylate, ethyl (meth)acrylate, n-butyl (meth)acrylate, isobutyl (meth)acrylate, 2-methoxyethyl (meth)acrylate, 2-ethoxyethyl (meth)acrylate and 2-(n-propoxy)ethyl (meth)acrylate; and carboxyl-containing compounds such as (meth)acrylic acid, crotonic acid, maleic acid, fumaric acid and itaconic acid.

The content of the structure unit (2) in the fluorine-containing copolymer (B) is 5 to 70 mol %, preferably 10 to 60 mol %, and more preferably 20 to 50 mol %. When the content of the structure unit (2) is below the range, water retention in the electrode tends to be poor, resulting in occasional failure in obtaining good power generation performance under low humidity conditions. On the other hand, when it is above the range, the water drainage in the electrode catalyst layer tends to be poor, resulting in occasional failure in obtaining good power generation performance under high humidity conditions.

Examples of the hydroxyl-containing monomers capable of being the hydroxyl-containing structure unit include hydroxyl-containing vinyl ethers such as 2-hydroxyethyl vinyl ether, 3-hydroxypropyl vinyl ether, 2-hydroxypropyl vinyl ether, 4-hydroxybutyl vinyl ether, 3-hydroxybutyl vinyl ether, 5-hydroxypentyl vinyl ether and 6-hydroxyhexyl vinyl ether; hydroxyl-containing allyl ethers such as 2-hydroxyethyl allyl ether, 4-hydroxybutyl allyl ether and glycerol monoallyl ether; allyl alcohol; and hydroxyethyl(meth)acrylate ester. These compounds may be used singly or in a combination of two or more kinds.

The content of the hydroxyl-containing structure unit in the fluorine-containing copolymer (B) is 5 to 70 mol %, preferably 10 to 60 mol %, and more preferably 20 to 50 mol %. When the content of the hydroxyl-containing structure unit is below the range, water retention in the electrode tends to be poor, resulting in occasional failure in obtaining good power generation performance under low humidity conditions. On the other hand, when it is above the range, water drainage in the electrode catalyst layer tends to be poor, resulting in occasional failure in obtaining good power generation performance under high humidity conditions.

When using the hydroxyl-containing monomer in the preparation of the fluorine-containing copolymer (B), it is preferable to use, as the vinyl ether monomer, an alkyl vinyl ether, a cycloalkyl vinyl ether, a carboxylic acid vinyl ester or a carboxyl-containing compound from the viewpoint of increasing the yield of the polymerization reaction. Especially, from the viewpoint of increasing the fluorine content incorporated into the fluorine-containing copolymer (B) by copolymerization, for example, low molecular weight monomers such as methyl vinyl ether, ethyl vinyl ether, n-propyl vinyl ether, isopropyl vinyl ether, vinyl acetate, vinyl propionate, vinyl butyrate and vinyl pivalate are preferable.

The fluorine content in the fluorine-containing copolymer (B) is 30 to 70% by weight and preferably 40 to 60% by weight. When the fluorine content is below the range, the water repellent properties in the electrode catalyst layer become poor, resulting in occasional failure in obtaining good power generation performance and excellent durability in power generation under high humidity conditions. On the other hand, when it is above the range, the water retention properties in the electrode catalyst layer become poor, resulting in occasional failure in obtaining good power generation performance and excellent durability in power generation under low humidity conditions. It is noted here that the fluorine contents were obtained by measurement using the alizarine complexone measurement on the weight of the fluorine atom.

Mn of the fluorine-containing copolymer (B) is 5,000 to 500,000, preferably 10,000 to 300,000, and more preferably 10,000 to 100,000 relative to polystyrene measured by gel permeation chromatography (GPC) in tetrahydrofuran (THF) solvent. If Mn is below the range, the water repellent properties in the electrode catalyst layer become poor, resulting in occasional failure in obtaining good power generation performance under high humidity conditions, and on the contrary, if Mn is above the range, the viscosity of the electrode paste is drastically increased, resulting in occasional difficulty in fabrication of the electrode catalyst layer.

As the polymerization method for preparing the fluorine-containing copolymer (B), any of emulsion polymerization, suspension polymerization, bulk polymerization or solution polymerization may be used in the presence of a radical polymerization initiator, and a batch system, a semi-continuous system or a continuous system may be selected appropriately. As the radical polymerization initiator, an azo-containing polysiloxane may be used and other initiators may also be concurrently used.

Examples of the other radical polymerization initiators concurrently used include diacyl peroxides such as acetyl peroxide and benzoyl peroxide;

ketone peroxides such as methyl ethyl ketone peroxide and cyclohexanone peroxide;

hydroperoxides such as hydrogen peroxide, tert-butyl hydroperoxide and cumene hydroperoxide;

dialkyl peroxides such as di-tert-butyl peroxide, dicumyl peroxide and dilauroyl peroxide;

peroxy esters such as tert-butyl peroxy acetate and tert-butyl peroxy pivalate;

azo-type compounds such as azobisisobutyronitrile and azobisisovaleronitrile;

persulfuric acid salts such as ammonium persulfate, sodium persulfate and potassium persulfate;

iodine-containing fluorine compounds such as perfluoroethyl iodide, perfluoropropyl iodide, perfluorobutyl iodide, (perfluorobutyl)ethyl iodide, perfluorohexyl iodide, 2-(perfluorohexyl)ethyl iodide, perfluoroheptyl iodide, perfluorooctyl iodide, 2-(perfluorooctyl)ethyl iodide, perfluorodecyl iodide, 2-(perfluorodecyl)ethyl iodide, heptafluoro-2-iodopropane, perfluoro-3-methylbutyl iodide, perfluoro-5-methylhexyl iodide, 2-(perfluoro-5-methylhexyl)ethyl iodide, perfluoro-7-methyloctyl iodide, 2-(perfluoro-7-methyloctyl)ethyl iodide, perfluoro-9-methyldecyl iodide, 2-(perfluoro-9-methyldecyl)ethyl iodide, 2,2,3,3-tetrafluoropropyl iodide, 1H,H,5H-octafluoropentyl iodide, 1H,1H,7H-dodecafluoroheptyl iodide, tetrafluoro-1,2-diiodoethane, octafluoro-1,4-diiodobutane and dodecafluoro-1,6-diiodohexane.

In addition, inorganic reducing agents such as sodium bisulfite and sodium pyrosulfite, and organic reducing agents such as cobalt naphthate and dimethylaniline may be concurrently used with the radical polymerization initiators as appropriate.

Preparation of the Fluorine-Containing Copolymer (B) May be performed by polymerization preferably in the solvent system using a solvent. Examples of the solvent include esters such as ethyl acetate, butyl acetate, isopropyl acetate, isobutyl acetate and cellosolve acetate; ketones such as acetone, methyl ethyl ketone, methyl isobutyl ketone and cyclohexanone; cyclic ethers such as tetrahydrofuran and dioxane; amides such as N,N-dimethyl formamide and N,N-dimethyl acetamide; aromatic hydrocarbons such as toluene and xylene; and these may be used as a mixture with an alcohol, an aliphatic hydrocarbon and the like as appropriate.

(iv) Organic Solvent

Examples of the organic solvents used for the electrode paste composition include ethanol, n-propyl alcohol, 2-propanol, 2-methyl-2-propanol, 2-butanol, n-butyl alcohol, 2-methyl-1-propanol, 1-pentanol, 2-pentanol, 3-pentanol, 2-methyl-1-butanol, 3-methyl-1-butanol, 2-methyl-2-butanol, 3-methyl-2-butanol, 2,2-dimethyl-1-propanol, cyclohexanol, 1-hexanol, 2-methyl-1-pentanol, 2-methyl-2-pentanol, 4-methyl-2-pentanol, 2-ethyl-1-butanol, 1-methylcyclohexanol, 2-methylcyclohexanol, 3-methylcyclohexanol, 4-methylcyclohexanol, 1-octanol, 2-octanol, 2-ethyl-1-hexanol, dioxane, butyl ether, phenyl ether, isopentyl ether, 1,2-dimethoxyethane, diethoxyethane, bis(2-methoxyethyl)ether, bis(2-ethoxyethyl)ether, cineole, benzyl ethyl ether, anisole, phenetol, acetal, methyl ethyl ketone, 2-pentanone, 3-pentanone, cyclopentanone, cyclohexanone, 2-hexanone, 4-methyl-2-pentanone, 2-heptanone, 2,4-diemthyl-3-pentanone, 2-octanone, γ-butyrolactone, n-butyl acetate, isobutyl acetate, sec-butyl acetate, pentyl acetate, isopentyl acetate, 3-methoxybutyl acetate, methyl butyrate, ethyl butyrate, methyl lactate, ethyl lactate, butyl lactate, 2-methoxyethanol, 2-ethoxyethanol, 2-(methoxymethoxy)ethanol, 2-isopropoxyethanol, 1-methoxy-2-propanol, 1-ethoxy-2-propanol, dimethyl sulfoxide, N-methyl formamide, N,N-dimethyl formamide, N,N-diethyl formamide, N,N-dimethyl acetamide, N-methyl-2-pyrrolidone (NMP), tetramethyl urea, hydrocarbon organic solvents such as toluene, xylene, heptane and octane, polyvalent alcoholic organic solvents such as ethylene glycol, propylene glycol and glycerol.

The solvents may be used singly or in a combination of two or more kinds, but from the viewpoint of polymer solubility, it is preferable that a water-soluble non-protonic dipolar organic solvent is contained and more preferable that the content of the water-soluble non-protonic dipolar organic solvent is 10% or more.

Examples of the water-soluble non-protonic dipolar organic solvent include dimethyl acetamide, dimethyl formamide, N-methyl-2-pyrrolidone (NMP), dimethyl sulfoxide, tetramethyl urea, 1,3-dimethyl-2-imidazolidinone and γ-butyrolactone.

(v) Dispersing Agent

The electrode paste composition may further be added with a dispersing agent as appropriate. Examples of such dispersing agent include an anionic surfactant, a cationic surfactant, an amphoteric surfactant and a nonionic surfactant.

Examples of the anionic surfactant include oleic acid/N-methyl taurine, potassium oleate/diethanolamine salt, alkyl ether sulfate/triethanolamine salt, polyoxyethylene alkyl ether sulfate/triethanolamine salt, an amine salt of a specially modified polyether ester acid, an amine salt of a higher aliphatic acid derivative, an amine salt of a specially modified polyester acid, an amine salt of a high molecular weight polyether ester acid, an amine salt of a specially modified phosphate ester, an amideamine salt of a high molecular weight polyester acid, an amideamine salt of a specific aliphatic acid derivative, an alkylamine salt of a higher aliphatic acid, an amideamine salt of a high molecular weight polycarboxylic acid, sodium laurate, sodium stearate, sodium oleate, sodium lauryl sulfate ester, sodium cetyl sulfate ester, sodium stearyl sulfate ester, sodium oleyl sulfate ester, a lauryl ether sulfate ester salt, a sodium alkylbenzenesulfonate, an oil-soluble alkylbenzenesulfonic acid salt, an α-olefin sulfonic acid salt, a disodium salt of higher alcohol phosphate monoester, a disodium salt of a higher alcohol phosphate diester, and a zinc dialkyl dithiophosphate.

Examples of the cationic surfactant include benzyl dimethyl{2-[2-(P-1,1,3,3-tetramethylbutylphenoxy)ethoxy]ethyl}ammonium chloride, octadecylamine acetate, tetradecylamine acetate, octadecyl trimethyl ammonium chloride, beef tallow trimethyl ammonium chloride, dodecyl trimethyl ammonium chloride, palm trimethyl ammonium chloride, hexadecyl trimethyl ammonium chloride, behenyl trimethyl ammonium chloride, palm dimethyl benzyl ammonium chloride, tetradecyl dimethyl benzyl ammonium chloride, octadecyl dimethyl benzyl ammonium chloride, dioleyl dimethyl ammonium chloride, 1-hydroxyethyl-2-beef tallow imidazoline quaternary salt, 2-heptadecenyl-hydroxyethyl imidazoline, stearamide ethyl diethylamine acetate, stearamide ethyl diethylamine chloride, triethanolamine monostearate formate, alkylpyridinium salt, higher alkylamine ethylene oxide adduct, polyacrylamideamine salt, modified polyacrylamideamine salt, and perfluoroalkyl quaternary ammonium iodide.

Examples of the amphoteric surfactant include dimethyl palm betaine, dimethyl lauryl betaine, sodium laurylaminoethyl glycine, sodium laurylaminopropionate, stearyl dimethyl betaine, lauryl dihydroxyethyl betaine, amide betaine, imidazolinium betaine, lecithin, sodium 3-[ω-fluoroalkanoyl-N-ethylamino]-1-propanesulfonate, and N-[3-(perfluorooctanesulfonamide)propyl]-N,N-dimethyl-N-carboxymethylene ammonium betaine.

Examples of the nonionic surfactant include a palm aliphatic acid diethanolamide (1:2 type), palm aliphatic acid diethanolamide (1:1 type), beef tallow fatty acid diethanolamide (1:2 type), beef tallow fatty acid diethanolamide (1:1 type), oleic acid diethanolamide (1:1 type), hydroxyethyl laurylamine, polyethylene glycol laurylamine, polyethylene glycol palmamine, polyethylene glycol stearylamine, polyethylene glycol beef tallow amine, polyethylene glycol beef tallow propylenediamine, polyethylene glycol dioleylamine, dimethyl laurylamine oxide, dimethyl stearylamine oxide, dihydroxyethyl laurylamine oxide, perfluoroalkylamine oxide, polyvinyl pyrrolidone, higher alcohol ethylene oxide adduct, alkyl phenol ethylene oxide adduct, fatty acid ethylene oxide adduct, polypropylene glycol ethylene oxide adduct, fatty acid ester of glycerin, fatty acid ester of pentaerythritol, aliphatic acid ester of sorbitol, fatty acid ester of sorbitan, and fatty acid ester of sugar.

The dispersing agents may be used singly or in a combination of two or more kinds. Among them, a surfactant having basic group is preferable, an anionic or a cationic surfactant is more preferable, and a surfactant having a molecular weight of 5,000 to 30,000 is particularly preferable. Addition of the dispersing agent into the electrode paste composition imparts good storage stability and fluidity, and improves productivity at the time of coating.

(vi) Carbon Fiber

Into the electrode paste composition, a carbon fiber may further be added as appropriate. Examples of such carbon fiber include a rayon type carbon fiber, a PAN type carbon fiber, a lignin poval type carbon fiber, a pitch type carbon fiber and a vapor-phase grown carbon fiber. Among them, a vapor-phase grown carbon fiber is preferable.

Further addition of these carbon fibers into the electrode paste composition increases pore volume in the electrode catalyst layer, resulting in improvement of diffusion of a fuel gas or an oxygen gas, which relieves flooding or the like due to formed water, thereby leading to improvement of power generation performance.

(vii) Water

Into the electrode paste composition, water may further be added as appropriate. Addition of water has an effect of reducing heat generation at the time of preparing of the electrode paste composition.

[An Electrode Catalyst Layer]

An electrode catalyst layer of the present invention contains 20 to 90% by weight and preferably 40 to 85% by weight of the catalyst particles, 5 to 60% by weight and preferably 10 to 50% by weight of the ion exchange resin, 0.1 to 20% by weight and preferably 1 to 10% by weight of the water repellent agent, and optionally 0 to 10% by weight and preferably 0 to 3% by weight of the dispersing agent, and also optionally 0 to 20% by weight and preferably 1 to 10% by weight of the carbon fiber. Here, the total of these materials adds up to 100% by weight.

When the content of the catalyst particles is below the aforementioned range, there may be a case where the electrode reactivity is decreased. On the contrary, when it is above the aforementioned range, there may be a case where the proton conductivity efficiency is decreased, and there is also a tendency that pore volume sufficient to realize power generation in the electrode catalyst layer cannot be secured.

When the content of the ion exchange resin is below the aforementioned range, proton conductivity tends to decrease, and a role as a binder is not fulfilled, so that there is a case where the electrode may not be formed. On the contrary, when it is above the aforementioned range, the pore volume in the electrode tends to decrease.

When the content of the water repellent agent is within the aforementioned range, the balance between water retention and drainage properties in the electrode catalyst layer can be kept appropriate and thus good power generation performance and excellent durability in power generation can be realized under both low and high humidity conditions.

When the content of the dispersing agent is within the aforementioned range, the electrode paste with good storage stability and the electrode catalyst layer with good dispersibility can be obtained. Further, when the content of the carbon fiber is within the aforementioned range, a suitable pore volume is secured, leading to improvement in water drainage and increase of the power output.

Accordingly, in the electrode paste composition used to form the electrode catalyst layer of the present invention, the catalyst particles, ion exchange resin and water repellent agent, and dispersing agent and carbon fiber, both of which are optionally used, are blended in such an amount that the aforementioned composition is obtained when forming the electrode catalyst layer by them. Further, the content of an organic solvent used when preparing the electrode paste composition is, relative to 100% by weight of the total of the paste composition, 5 to 95% by weight and preferably 15 to 90% by weight, and the water content optionally used is 0 to 70% by weight and preferably 2 to 30% by weight.

When the content of the organic solvent is within the aforementioned range, the composition is in a form of paste, which is suitable for handling. Furthermore, when the content of water is within the range, heat generation during preparation of the catalyst paste can effectively be reduced.

<Preparation of an Electrode Paste Composition>

An electrode paste composition of the present invention may be prepared by, for instance, mixing each of the above components at the prescribed ratio, and then kneading the mixture by publicly known methods. The order of mixing each component is not particularly restricted, and for instance, it is preferable that all of components are mixed and stirred for a certain period of time, or components other than the dispersing agent are mixed and stirred for a certain period of time and then the dispersing agent is added as appropriate and stirred for a certain period of time. Furthermore, the amount of the organic solvent may be changed as appropriate in order to control the viscosity of the composition.

<Method for Preparing the Electrode Catalyst Layer>

A method for preparing the electrode catalyst layer of the present invention is not particularly restricted, and for instance, there may be mentioned a method in which the electrode paste composition is prepared, coated on an electrode substrate, a transfer substrate or a proton-conductive membrane, and then dried to obtain the electrode catalyst layer.

When an electrolyte membrane-electrode assembly having the electrode catalyst layer of the present invention is prepared, the electrode catalyst layers are formed on both sides of a proton-conductive membrane (solid polymer electrolyte membrane). As the method for forming the electrode catalyst layer, there may be mentioned, for instance, a method in which the electrode paste composition is directly coated on the proton-conductive membrane and then dried;

a method in which the electrode paste composition is applied on the electrode substrate and dried to form the electrode having the electrode catalyst layer, and then the electrode thereby obtained and a proton-conductive membrane are bonded with each other by a hot-press method and the like in such a manner that the side of the electrode catalyst layer is in contact with the proton-conductive membrane;

a method in which the electrode paste composition is coated on another substrate (a transfer substrate) to form the electrode catalyst layer temporarily and is transferred on the ion exchange membrane or the electrode substrate.

As mentioned above, when the electrode catalyst layer of the present invention is formed on the proton-conductive membrane, there is no restriction with regard to the conductive membrane as far as it is a publicly known membrane, but it is preferable that the electrode catalyst layer is formed on the proton-conductive membrane made of the aromatic polymer with a protonic acid group as described above.

As a method for coating the electrode paste composition, there may be mentioned, for example, a brush painting, a fine-brush painting, a bar coater coating, a knife coater coating, a doctor blade method, a screen printing, a spray coating, and the like.

As the electrode substrate, an electrode substrate generally used for a fuel cell, for instance, a porous electrically conductive sheet mainly composed of an electrically conductive material may be used without any particular restriction. Furthermore, as the transfer substrate, a polytetrafluoroethylene (PTFE) sheet, or a glass plate, a metal plate or the like whose surface is treated with a releasing agent may be used.

Examples of the electrically conductive material include a burned substance from polyacrylonitrile, a burned substance from pitch, carbon materials such as graphite and expanded graphite, a stainless steel, molybdenum, titanium. The form of the electrically conductive material may be a fiber, particles or others and is not restricted but an electrically conductive inorganic material in a fiber form (an inorganic electrically conductive fiber) is preferable, and a carbon fiber is especially preferable.

As the porous electrically conductive sheet using an inorganic electrically conductive fiber, any structure of a woven or nonwoven fabric may be used. As the woven fabric, any of a plain fabric, a twill fabric, a satin fabric, a pattern fabric, a tapestry fabric and the like may be used without particular restriction. Further, as the nonwoven fabric, those prepared by a paper making method, a needle punch method, a span bond method, a water jet punching method, a melt blow method or the like may be used without particular restriction. Further, a porous electrically conductive sheet using an inorganic electrically conductive fiber may also be in the form of knitted.

Especially when a carbon fiber is used as these fabrics, a woven fabric obtained by carbonating or graphitizing flat fabric using a spun yarn pretreated with a flame retardant, a nonwoven fabric obtained by processing a yarn pretreated with a flame retardant by a needle punch method, a water jet punch method and the like, then carbonating or graphitizing the nonwoven fabric thereby obtained, and a mat nonwoven fabric obtained by a paper making method using a yarn pretreated with a flame retardant, a carbonated yarn or a graphitized yarn are preferable. For example, a carbon paper of "TGP series" and "SO series" manufactured by Toray Industries, Inc., a carbon cloth manufactured by E-TEK Corp. and the like may be preferably used.

In order to improve electrical conductivity, it may also be preferable to add, as an adjuvant agent, electrically conductive particles such as a carbon black, and an electrically conductive fiber such as a carbon fiber into the porous electrically conductive sheet.

The thickness of the layer coated in the manner as mentioned above (namely thickness of the electrode catalyst layer) is not particularly restricted, but the content of the metal supported as the catalyst in the electrode catalyst layer is in the range of 0.05 to 4.0 mg/cm$^2$, and preferably 0.1 to 2.0 mg/cm$^2$ per unit coating area. Within this range, sufficiently high catalyst activity may be realized and also a proton may be taken out effectively.

Removal of a solvent after coating of the electrode paste composition is carried out with the drying temperature of 20 to 180° C. and preferably 50 to 160° C., and with the drying time of 5 to 180 minutes and preferably 30 to 120 minutes. Further, as appropriate, the removal may be carried out by immersing in water. The immersion may be done at a water temperature of 5 to 120° C. and preferably 15 to 95° C. and at an immersion time of 1 minute to 72 hours and preferably 5 minutes to 48 hours.

The pore volume of the electrode catalyst layer thus obtained is 0.1 to 3.0 mL/g-electrode catalyst layer and preferably 0.2 to 2.0 mL/g-electrode catalyst layer. When the pour volume is above the range, mechanical characteristics tend to be lowered, and also there may be a case where conductive paths of electrons and protons are broken, leading to lowering of the power generation performance. On the contrary, when the pour volume is below the range, there may be a case where the drainage of water becomes poor, leading to lowering of the power generation performance.

EXAMPLES

In the following, the present invention is explained more specifically based on Examples, but the invention is not restricted by them. It is noted here that measurements of sulfonic acid equivalent and the molecular weight, preparation of a fuel cell, and evaluation of the power generation performance were carried out in the following ways.

1. Sulfonic Acid Equivalent

An obtained polymer with a sulfonic acid group was fully washed until washing water became neutral in order to remove remaining free acid, and then dried. Then, a predetermined amount was weighed and titrated with a NaOH standard solution by using a phenolphthalein indicator dissolved in a THF/water mixture solvent to determine the sulfonic acid equivalent from a point of neutralization.

2. Measurement of the Molecular Weight

A molecular weight of a polyarylene having no sulfonic acid group and a fluorine-containing copolymer was obtained as the value relative to polystyrene by GPC using tetrahydrofuran (THF) as a solvent. A molecular weight of a polyarylene with a sulfonic acid group was obtained as the value relative to polystyrene by GPC using N-methyl-2-pyrrolidone (NMP), in which lithium bromide and phosphoric acid were added, as an eluting solvent.

3. Preparation of a Fuel Cell and Evaluation of Power Generation Performance

A membrane-electrode assembly prepared by the following Examples and Comparative Examples was sandwiched by two electron-collecting plates made of titanium, and a heater was placed at its outside to set up a fuel cell having an effective surface area of 25 cm². The following evaluations were done for the fuel cell thus prepared.

(Evaluation 1)

Hydrogen and air were charged under 2 atmospheres (under a constant back pressure of 0.2 MPa) under the conditions of a humidity of an anode electrode and a cathode electrode at 40% RH and 100% RH, respectively, while keeping the temperature of the fuel cell at 80° C. to measure a voltage between the terminals at an electric current density of 0.1 A/cm² and 1.0 A/cm². The results are shown in Table 1.

(Evaluation 2)

After evaluation 1 was performed, a durability test was conducted under a humidity of 40% RH while keeping the temperature of the fuel cell at 120° C. Hydrogen and air were charged under 2 atmospheres (under a constant back pressure of 0.2 MPa) to measure the time till the voltage between the terminals was decreased to 0.3 V or lower while maintaining the electric current at 0.2 A/cm². The results are shown in Table 1.

Synthesis Example 1

Synthesis examples of sulfonated polyarylene preferably used in the present invention will be explained below. The present invention is not restricted by the following synthesis examples in any way, but when the following sulfonated polyarylene is used as the ion exchange resin in the catalyst layer or as the ion exchange membrane, a fuel cell showing excellent power generation performance can be obtained.

(1) Synthesis of a Hydrophobic Unit

Into a three-neck flask of 1-L volume equipped with a stirrer, a thermometer, a Dean-Stark column, a nitrogen inlet and a cooling column were charged 48.8 g (284 mmol) of 2,6-dichlorobenzonitrile, 89.5 g (266 mmol) of 2,2-bis(4-hydroxyphenyl)-1,1,1,3,3,3-hexafluoropropane, and 47.8 g (346 mmol) of potassium carbonate. After the atmosphere was displaced by nitrogen, 346 mL of sulfolane and 173 mL of toluene were added to obtain a mixture, which was stirred and then heated under reflux in an oil bath at 150° C. Water produced by the reaction was trapped by the Dean-Stark column. After 3 hours, when almost no water was produced, toluene was removed outside the system from the Dean-Stark column. The reaction temperature was gradually raised to 200° C. and stirring was continued for 3 hours. Thereafter, 9.2 g (53 mmol) of 2,6-dichlorobenzonitrile was added and the reaction was further continued for 5 hours.

After the reaction solution was allowed to cool, it was diluted with 100 mL of toluene. Insoluble inorganic salts in the reaction solution were removed by filtration, and the filtrate was added into 2 L of methanol to precipitate a product. The product precipitated was collected by filtration, dried, dissolved in 250 mL of tetrahydrofuran, and then the solution was poured into 2 L of methanol for reprecipitation. White particles precipitated were collected by filtration and dried to obtain 109 g of the target product. The number-average molecular weight (Mn) measured by GPC was 9,500. The compound obtained was identified as an oligomer represented by the following formula (I) (hereinafter sometimes referred to as "hydrophobic unit (I)")

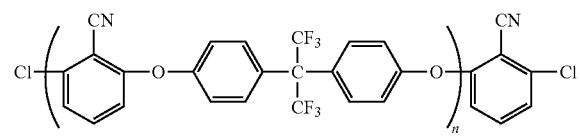

(2) Synthesis of a Basic Unit

Into a three-neck flask of 2-L volume equipped with a stirrer, a thermometer, a cooling column and a nitrogen inlet were charged 150.7 g (0.560 mol) of 2,5-dichloro-4'-fluorobenzophenone, 114.4 g (1.68 mol) of imidazole, 100.6 g (0.728 mol) of potassium carbonate, and 840 ml of N,N'-dimethyl acetamide. The reaction solution was heated in an oil bath at 110° C. for 2 hours under nitrogen atmosphere. After disappearance of the raw materials was confirmed by thin layer chromatography, the reaction solution was allowed to cool to room temperature. Then, the solution was slowly added into 3 L of water to solidify the product, which was then filtered. The product collected by filtration was dissolved into 1.2 L of THF, and then the solution was added with 4 L of toluene and washed by salt solution until the water layer became neutral. The organic layer was dried by magnesium sulfate, and then the solvent was removed by a rotary evaporator to obtain 180 g of a crude product. Then, it was subjected to recrystallization and separation operations by using a mixed solvent containing 1 L of toluene and 20 mL of methanol heated at 80° C. to obtain 155 g of white solid of 2,5-dichloro-4'-(1-imidazolyl)benzophenone (hereinafter sometimes referred to as "basic unit (II)") represented by the following formula (II) (yield 87%).

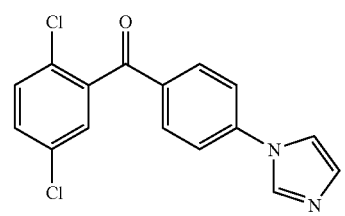

(3) Synthesis of a Sulfonated Polyarylene

Into a mixture of 135.0 g (336 mmol) of neopentyl 3-(2,5-dichlorobenzoyl)benzenesulfonate, 40.7 g (5.6 mmol) of the hydrophobic unit (I) obtained in (1), 6.71 g (16.8 mmol) of the basic unit (II) obtained in (2), 6.71 g (10.3 mmol) of bis(triphenylphosphine)nickel dichloride, 35.9 g (137 mmol) of triphenylphosphine, 1.54 g (10.3 mmol) of sodium iodide and 53.7 g (821 mmol) of zinc was added 540 mL of dried N,N-dimethyl acetamide (DMAc) under nitrogen. The reaction system was heated with stirring (heated ultimately till 79° C.) to carry out the reaction for 3 hours. During the reaction it was observed that the viscosity in the system was increased. The polymerization solution was diluted by 730 mL of DMAc, stirred for 30 minutes, and then filtered by using celite as a filtering aid.

A portion of the filtrated liquid was poured into methanol to solidify the product. The molecular weight of the copolymer containing a neopentyl-protected sulfonic acid derivative by GPC was 58,000 for Mn and 135,300 for Mw.

The filtrated liquid was concentrated by an evaporator, to which 43.8 g (505 mmol) of lithium bromide was added, and then the reaction was carried out at the inner temperature of 110° C. for 7 hours under nitrogen atmosphere. After the reaction, the solution was cooled to room temperature and then poured into 4 L of acetone to solidify the product. The solid substance was collected by filtration, air-dried, crushed by a mixer, and then washed by 1500 ml of 1N hydrochloric acid with stirring. After filtration, the product was washed with ion-exchanged water until pH of the washing solution was 5 or higher and then dried at 80° C. overnight to obtain 23.0 g of the target sulfonated polymer. The molecular weight of this deprotected sulfonated polymer was 60,000 for Mn and 175,000 for Mw, and the ion exchange capacity was 2.4 meq/g. The sulfonated polyarylene thus obtained is a compound represented by the following formula (III) (hereinafter sometimes referred to as "sulfonated polymer (III)").

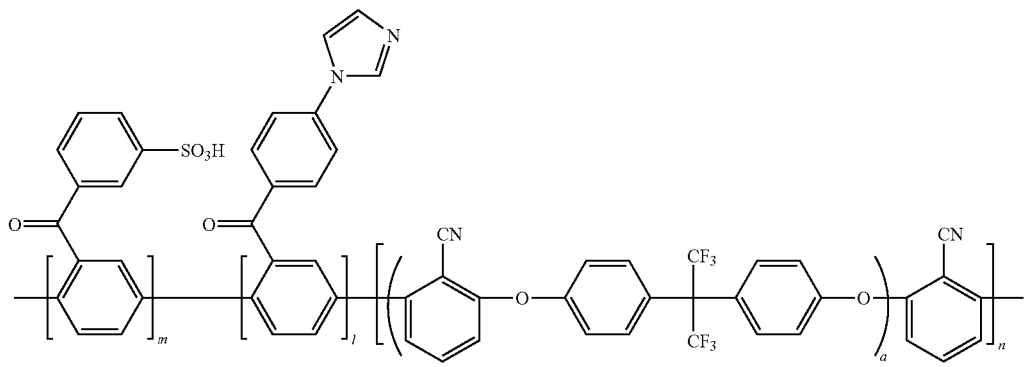

(III)

Example 1

<Preparation of an Electrode Paste>

Into a polyethylene bottle of 50 mL volume containing 25 g of zirconia balls having a diameter of 10 mm ("YTZ ball", manufactured by Nikkato Corp.) was charged a mixture containing 1.51 g of platinum supported on carbon particles (46% by weight of supported Pt; "TEC 10E50E", manufactured by Tanaka Kikinzoku Kogyo K. K.), 0.88 g of distilled water, 4.31 g of a N-methyl-2-pyrrolidone solution of the sulfonated polymer (III) obtained by the synthesis example 1 (the solid component of 15% by weight), 12.47 g of N-methyl-2-pyrrolidone, 0.49 g of a vapor-phase grown carbon fiber ("VGCF", manufactured by Showa Denko K. K.), and 0.6 g of a water-dispersed liquid (solid component of 20% by weight) of a fluorine-containing copolymer A (molecular weight of 10,000) prepared by using as monomers fluoroacrylate (a compound represented by $C_nF_{2n+1}CH_2CH_2OCOCH{=}CH_2$, here, the average value of n is 9) and stearyl acrylate, and then they were stirred with a paint shaker for 30 minutes to obtain an electrode paste A.

<Preparation of an Electrode Catalyst Layer>

Onto both sides of the electrolyte membrane (50 μm in thickness) composed of the sulfonated polymer (III) obtained by the synthesis example 1, the electrode paste A was applied by using a mask having an opening of 5 cm×5 cm by a doctor blade method. Then it was dried at 120° C. for 60 minutes to form an electrode catalyst layer A having 0.5 mg/cm² of coated platinum.

<Preparation of a Membrane-electrode Assembly>

A layer made of a carbon black powder/PTFE mixture was formed on a water repellent-treated carbon paper. Then, the electrolyte membrane, on both sides of which were formed the electrode catalyst layers A, was sandwiched by two sheets of the water repellent-treated carbon paper in such a way that the catalyst layer A was brought into contact with the layer composed of the carbon black powder/PTFE mixture, and thereafter they were molded by a hot-press method under a pressure of 30 kg/cm² and at 160° C. for 15 minutes to obtain a membrane-electrode assembly.

Example 2

<Preparation of an Electrode Paste>

An electrode paste B was obtained in a similar manner to that in Example 1 except that the water-dispersion liquid of the fluorine-containing copolymer A in Example 1 was replaced by 0.8 g of a methyl ethyl ketone solution containing the fluorine-containing copolymer B (solid component of 15% by weight) prepared by using a monomer mixture containing hexafluoropropylene, perfluoro(propyl vinyl ether), ethyl vinyl ether and hydroxyethyl vinyl ether at the molar ratio of 35:15:25:25. It is noted here that the molecular weight of the fluorine-containing copolymer B was 80,000, the fluorine content measured by the alizarine complexone method was 43%, and the hydroxyl concentration was 1.6 mmol/g.

<Preparation of an Electrode Catalyst Layer>

The electrode catalyst layer B was formed on both sides of the electrolyte membrane in a similar manner to that in Example 1 except that the electrode paste B was used instead of the electrode paste A in Example 1.

<Preparation of a Membrane-electrode Assembly>

A layer composed of a black powder/PTFE mixture was formed on a water repellent-treated carbon paper. Then, the electrolyte membrane, on both sides of which were formed the electrode catalyst layers B, was sandwiched by two sheets of the water repellent-treated carbon paper in such a way that the catalyst layer B was brought into contact with the layer composed of the carbon black powder/PTFE mixture, and thereafter they were molded by a hot-press method under a pressure of 30 kg/cm² and at 160° C. for 15 minutes to obtain a membrane-electrode assembly.

Comparative Example 1

<Preparation of an Electrode Paste>

The electrode paste C was obtained in a similar manner to that in Example 1 except that 0.2 g of 60% aqueous PTFE dispersion liquid (manufactured by Du Pont-Mitsui Fluorochemicals Co., Ltd.) was used instead of the aqueous dispersion liquid of the fluorine-containing copolymer A (solid component of 20% by weight) in Example 1.

<Preparation of an Electrode Catalyst Layer>

The electrode catalyst layer C was formed on both sides of the electrolyte membrane in a similar manner to that in Example 1, except that the electrode paste C was used instead of the electrode paste A in Example 1.

<Preparation of a Membrane-electrode Assembly>

A layer composed of a carbon black powder/PTFE mixture was formed on a water repellent-treated carbon paper. Then, the electrolyte membrane, on both sides of which were formed the electrode catalyst layers C, was sandwiched by two sheets of the water repellent-treated carbon paper in such a way that the catalyst layer C was brought into contact with the layer composed of the carbon black powder/PTFE mixture, and thereafter they were molded by a hot-press method under a pressure of 30 kg/cm² and at 160° C. for 15 minutes to obtain a membrane-electrode assembly.

Comparative Example 2

<Preparation of an Electrode Paste>

The electrode paste D was obtained in a similar manner to that in Example 1 except that the aqueous dispersion liquid of the fluorine-containing copolymer A (solid component of 20% by weight) in Example 1 was not used.

<Preparation of an Electrode Catalyst Layer>

The electrode catalyst layer D was formed on both sides of the electrolyte membrane in a similar manner to that in Example 1, except that the electrode paste D was used instead of the electrode paste A in Example 1.

<Preparation of a Membrane-electrode Assembly>

A layer composed of a carbon black powder/PTFE mixture was formed on a water repellent-treated carbon paper. Then, the electrolyte membrane, on both sides of which were formed the electrode catalyst layers D, was sandwiched by two sheets of the water repellent-treated carbon paper in such a way that the catalyst layer D was brought into contact with the layer composed of the carbon black powder/PTFE mixture, and thereafter they were molded by a hot-press method under a pressure of 30 kg/cm² and at 160° C. for 15 minutes to obtain a membrane-electrode assembly.

Comparative Example 3

<Preparation of an Electrode Paste>

Into a polyethylene bottle of 50 mL volume containing 25 g of zirconia balls with diameter of 10 mm ("YTZ ball", manufactured by Nikkato Corp.) was charged a mixture of 1.51 g of platinum supported on carbon particles (46% by weight of supported Pt; "TEC 10E50E", manufactured by Tanaka Kikinzoku Kogyo K. K.), 0.88 g of distilled water, 12.47 g of n-propyl alcohol, 4.59 g of 20.1% by weight of Nafion solution (trade name, manufactured by E. I. du Pont de Nemours and Company) and 0.49 g of a vapor-phase grown carbon fiber ("VGCF", manufactured by Showa Denko K. K.), and then they were stirred with a paint shaker for 30 minutes to obtain an electrode paste E.

<Preparation of an Electrode Catalyst Layer>

The electrode catalyst layer E was formed on both sides of the electrolyte membrane in a similar manner to that in Example 1, except that the electrode paste E was used instead of the electrode paste A in Example 1.

<Preparation of a Membrane-electrode Assembly>

A layer composed of a carbon black powder/PTFE mixture was formed on a water repellent-treated carbon paper. Next, the electrolyte membrane, on both sides of which the electrode catalyst layers E were formed, was sandwiched by two sheets of the water repellent-treated carbon paper in such a manner that the catalyst layer E was brought into contact with the layer composed of the carbon black powder/PTFE mixture, and then they were molded by a hot-press method under a pressure of 30 kg/cm² and at 160° C. for 15 minutes to obtain a membrane-electrode assembly.

TABLE 1

|  | Evaluation 1 | | | | Evaluation 2 |
| --- | --- | --- | --- | --- | --- |
|  | Relative humidity 40% RH | | Relative humidity 100% RH | | Voltage |
|  | 0.1 (A/cm²) | 1.0 (A/cm²) | 0.1 (A/cm²) | 1.0 (A/cm²) | retention time (hr) |
| Ex. 1 | 0.83 | 0.60 | 0.85 | 0.69 | 450 |
| Ex. 2 | 0.84 | 0.65 | 0.87 | 0.71 | 500 |
| Comp. Ex. 1 | 0.78 | 0.53 | 0.80 | 0.53 | 255 |
| Comp. Ex. 2 | 0.77 | 0.49 | 0.80 | 0.50 | 250 |
| Comp. Ex. 3 | 0.77 | 0.52 | 0.80 | 0.60 | 300 |

The invention claimed is:

1. An electrode catalyst layer comprising catalyst particles, an ion exchange resin and a water repellent agent,
   wherein the ion exchange resin is a hydrocarbon type electrolyte, and
   the water repellent agent comprises at least one copolymer selected from the group consisting of
   (A) a fluorine-containing copolymer having a structure unit derived from a polyfluoroalkyl-containing (meth)acrylate, and
   (B) a fluorine-containing copolymer having a structure unit represented by the following general formula (1) derived from a fluorine-containing olefin monomer and a structure unit represented by the following general formula (2) derived from a vinyl ether monomer:

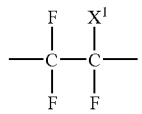

(1)

in the formula (1), $X^1$ represents a fluorine atom, a fluoroalkyl group or a group represented by $OW^1$ wherein $W^1$ represents an alkyl group or a fluoroalkyl group,

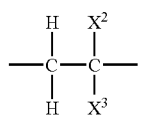

(2)

in the formula (2), $X^2$ represents a hydrogen atom or a methyl group, $X^3$ represents a group represented by $(CH_2)_hOW^2$ wherein $W^2$ represent an alkyl group, a hydroxyalkyl group, a glycidyl group or a fluoroalkyl group, and h represents an integer of 0 to 2, OCOW3 wherein $W^3$ represents an alkyl group, a hydroxyalkyl group, or a glycidyl group, a carboxyl group or an alkoxycarbonyl group, wherein the electrode catalyst layer contains 0.1 to 20% by weight of the water repellant agent.

2. The electrode catalyst layer according to claim 1, wherein the ion exchange resin is an aromatic polymer with a protonic acid group.

3. The electrode catalyst layer according to claim 2, wherein the aromatic polymer with a protonic acid group is at least one kind selected from the group consisting of polyether ketone, polyether ether ketone, polyether sulfone, polyimide, polybenzoxazole and polyarylene.

4. The electrode catalyst layer according to claim 2, wherein the-protonic acid-containing aromatic polymer is a polyarylene polymer with a sulfonic acid group represented by the following general formula (D):

(D)

$$\text{[structural formula D]}$$

in the formula (D), Y independently represents —CO—, —SO$_2$—, —SO—, —CONH—, —COO—, —(CF$_2$)$_i$— wherein i represents an integer of 1 to 10 or —C(CF$_3$)$_2$—;

$Z^1$ independently represents a direct bond, —(CH$_2$)$_j$— wherein j represents an integer of 1 to 10, —C(CH$_3$)$_2$—, —O— or —S—;

$Z^2$ independently represents a direct bond, —O— or —S—;

Ar represents an aromatic group having a substituent represented by —SO$_3$H, —O(CH$_2$)$_g$SO$_3$H or —O(CF$_2$)$_g$SO$_3$H wherein g represents an integer of 1 to 12;

A and D each independently represent a direct bond, —CO—, —SO$_2$—, —SO—, —CONH—, —COO—, —(CF$_2$)$_i$— wherein i represents an integer of 1 to 10, —(CH$_2$)$_j$— wherein j represents an integer of 1 to 10, —CR'$_2$— wherein R' represents an aliphatic hydrocarbon group, an aromatic hydrocarbon group or a halogenated hydrocarbon group, a cyclohexylidene group, a fluorenylidene group, —O— or —S—;

B independently represents an oxygen atom or a sulfur atom;

$R^1$ to $R^{16}$ each independently represent a hydrogen atom, a fluorine atom, an alkyl group, a partially or fully halogenated alkyl group, an allyl group, an aryl group, a nitro group, or a nitrile group;

$R^{20}$ independently represents a nitrogen-containing heterocyclic group;

m represents an integer of 0 to 10, n represents an integer of 0 to 10, and k represents an integer of 1 to 4;

s and t each independently represent an integer of 0 to 4, and r represents 0 or an integer of 1 or more;

p represents an integer of 0 to 4 and q represents an integer of 1 to 5; and x, y and z represent the molar ratio when x +y+z=100 mol %.

5. The electrode catalyst layer according to claim 1 or 4, wherein the water repellent agent contains a fluorine-containing copolymer (B) further having a hydroxyl-containing structure unit.

6. The electrode catalyst layer according to claim 1, wherein the water repellent agent contains the fluorine-containing copolymer (A) in which the content of structure unit derived from a polyfluoroalkyl-containing (meth)acrylate is 25 to 100% by weight.

7. The electrode catalyst layer according to claim 1, wherein the water repellent agent contains the fluorine-containing copolymer (B) in which the fluorine content is 30 to 70% by weight.

8. The electrode catalyst layer according to claim 1, wherein the water repellent agent contains (A).

9. The electrode catalyst layer according to claim 1, wherein the water repellent agent contains (B).

10. The electrode catalyst layer according to claim 1, wherein the water repellent agent contains (A) and (B).

11. The electrode catalyst layer according to claim 1, wherein the electrode catalyst layer contains 1 to 10% by weight of the water repellent agent.

12. The electrode catalyst layer according to claim 1, wherein the catalyst particles comprise platinum or a platinum alloy.

13. The electrode catalyst layer according to claim 1, wherein catalyst particles comprise a platinum alloy containing platinum and at least one other metal of the platinum group, iron, cobalt, titanium, gold, silver, chromium, manganese, molybdenum, tungsten, aluminum, silicon, rhenium, zinc or tin.

14. The electrode catalyst layer according to claim 1, wherein the catalyst particles are supported on a catalyst.

15. The electrode catalyst layer according to claim 1, wherein the electrode layer contains 20 to 90% by weight of the catalyst particles.

16. The electrode catalyst layer according to claim 1, wherein the electrode layer contains 40 to 85% by weight of the catalyst particles.

17. The electrode catalyst layer according to claim 1, wherein the electrode layer contains 5 to 60% by weight of the ion exchange resin.

18. The electrode catalyst layer according to claim 1, wherein the electrode layer contains 10 to 50% by weight of the ion exchange resin.

19. The electrode catalyst layer according to claim 1, wherein the electrode layer contains 20 to 90% by weight of the catalyst particles and 5 to 60% by weight of the ion exchange resin.

20. The electrode catalyst layer according to claim 1, wherein the electrode layer further comprises 1 to 20% by weight of carbon fibers.

* * * * *